(12) United States Patent  (10) Patent No.: US 7,958,141 B2
Sundaresan et al.  (45) Date of Patent: Jun. 7, 2011

(54) QUERY UTILIZATION

(75) Inventors: Neelakantan Sundaresan, Mountain View, CA (US); Nishith Parikh, San Jose, CA (US)

(73) Assignee: eBay Inc., San Jose, CA (US)

( * ) Notice: Subject to any disclaimer, the term of this patent is extended or adjusted under 35 U.S.C. 154(b) by 472 days.

(21) Appl. No.: 12/190,517

(22) Filed: Aug. 12, 2008

(65) Prior Publication Data

US 2009/0119285 A1  May 7, 2009

Related U.S. Application Data

(60) Provisional application No. 60/984,637, filed on Nov. 1, 2007.

(51) Int. Cl.
*G06F 17/30* (2006.01)
(52) U.S. Cl. .......................... 707/769; 707/779
(58) Field of Classification Search ................... 707/769, 707/779
See application file for complete search history.

(56) References Cited

U.S. PATENT DOCUMENTS

| | | | | |
|---|---|---|---|---|
| 5,632,015 A | * | 5/1997 | Zimowski et al. | 707/702 |
| 5,664,173 A | * | 9/1997 | Fast | 707/694 |
| 5,870,737 A | * | 2/1999 | Dockter et al. | 706/48 |
| 5,890,150 A | * | 3/1999 | Ushijima et al. | 707/714 |
| 6,263,334 B1 | * | 7/2001 | Fayyad et al. | 707/737 |
| 6,272,488 B1 | * | 8/2001 | Chang et al. | 707/769 |
| 6,480,836 B1 | * | 11/2002 | Colby et al. | 707/717 |
| 6,643,640 B1 | * | 11/2003 | Getchius et al. | 707/719 |
| 6,701,321 B1 | * | 3/2004 | Tsai | 707/694 |
| 6,820,073 B1 | * | 11/2004 | Bedell et al. | 707/754 |
| 6,853,998 B2 | * | 2/2005 | Biebesheimer et al. | 707/765 |
| 6,910,032 B2 | * | 6/2005 | Carlson et al. | 707/769 |
| 7,249,127 B2 | * | 7/2007 | Azzam | 707/772 |

* cited by examiner

*Primary Examiner* — Don Wong
*Assistant Examiner* — Kim T Nguyen
(74) *Attorney, Agent, or Firm* — Schwegman, Lundberg & Woessner, P.A.

(57) ABSTRACT

Methods and system for query utilization are described. A rate of a plurality of queries to a data source may be determined for a plurality of time periods. The plurality of queries may be associated with a term. A cost may be associated with a normal-to-deviated query state transition and a deviated-to-normal query state transition. A normal query state or a deviated query state may be assigned to a particular query on a particular time period of the plurality of time periods based on the rate of queries for the particular time period and the cost of the normal-to-deviated query state transition and the deviated-to-normal query state transition. A query burst may be identified during the plurality of time periods based on assignment of the normal query state or the deviated query state to the plurality of queries. The query burst may have the normal query state, the normal-to-deviated query state transition, and the deviated query state during a time period.

17 Claims, 23 Drawing Sheets

QUERY UTILIZATION

CROSS-REFERENCE TO A RELATED APPLICATION

This application claims the benefit of United States Provisional Patent Application entitled "Mining Surprises through Queries", Ser. No. 60/984,637, filed 1 Nov. 2007, the entire contents of which are herein incorporated by reference.

BACKGROUND

Users may make a number of queries with different terms to a data source operated by a provider. The provider may seek timely information associated with queries to use for a variety of purposes.

BRIEF DESCRIPTION OF THE DRAWINGS

Some embodiments are illustrated by way of example and not limitation in the figures of the accompanying drawings in which.

DETAILED DESCRIPTION

Example methods and systems for query utilization are described. In the following description, for purposes of explanation, numerous specific details are set forth in order to provide a thorough understanding of example embodiments. It will be evident, however, to one skilled in the art that embodiment of the present invention may be practiced without these specific details.

Figure 1:
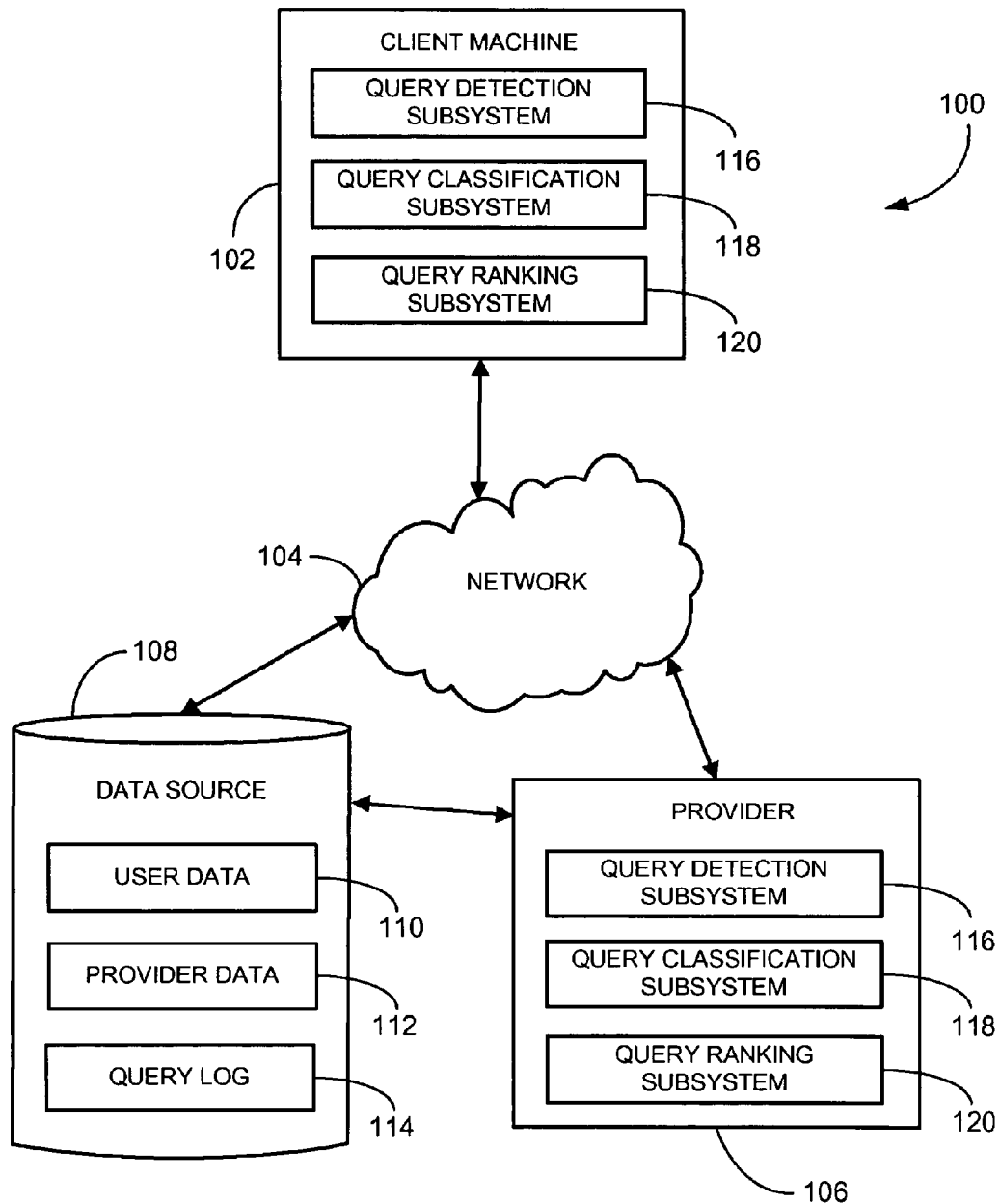
FIG. 1 is a block diagram of a system, according to example embodiments.

FIG. 1 illustrates an example system 100 in which a client machine 102 may be in communication with a provider 106 over a network 104. A user may communicate with the provider 106 and/or a client machine 102 to receive information associated with query bursts. A query burst may be a spike in a number of requests to the data source 108 during a time period. The query burst for one or more terms may occur infrequently (e.g., on one or more days) over a period of time and may be qualified as an unexpected result (e.g., a surprise).

Examples of the client machine 102 include a set-top box (STB), a receiver card, a mobile telephone, a personal digital assistant (PDA), a display device, a portable gaming unit, and a computing system; however other devices may also be used.

The network 104 over which the client machine 102 and the provider 106 are in communication may include a Global System for Mobile Communications (GSM) network, an Internet Protocol (IP) network, a Wireless Application Protocol (WAP) network, a WiFi network, or a IEEE 802.11 standards network as well as various combinations thereof. Other conventional and/or later developed wired and wireless networks may also be used.

The provider 106 may also be in communication with a data source 108. The data source 108 may include user data 110, provider data 112, and/or a query log 114. The user data 110 may include information regarding users of the provider 106. The provider data 112 may include information regarding searches and/or transactions conducted with the provider 106. For example, the sale of an item from one user to another may be stored as the provider data 116. The query log 114 may be a log of a number of queries to the data source 108 and/or a different data source. The query log 114 may be from eBay Inc., of San Jose, Calif. or from a different provider 106.

The provider 106 and/or the client machine 102 may include a query detection subsystem 110, a query classification subsystem 188, and/or a query ranking subsystem 120. The query detection subsystem 116 detects a query burst during one or more time periods (e.g., days). The query classification subsystem 118 classifies a query burst. The query ranking subsystem 120 ranks a query burst.

In an example embodiment, the system 100 may be a part of an online content or electronic commerce system. The query bursts detection, classification, and/or ranking may be used for a wide variety of purposes including merchandizing, creating traffic stickiness, load handling on applications, and fraud detection. The queries coming into an online system provide a good proxy for information flowing through a system in the form of streams. In online communities, query frequency and variation on frequencies carry information about wisdom of crowds and about events, trends, things in vogue or products in demand. The detection of query bursts through queries can be leveraged for a variety of applications that feed on various kinds of demand information.

Figure 2:
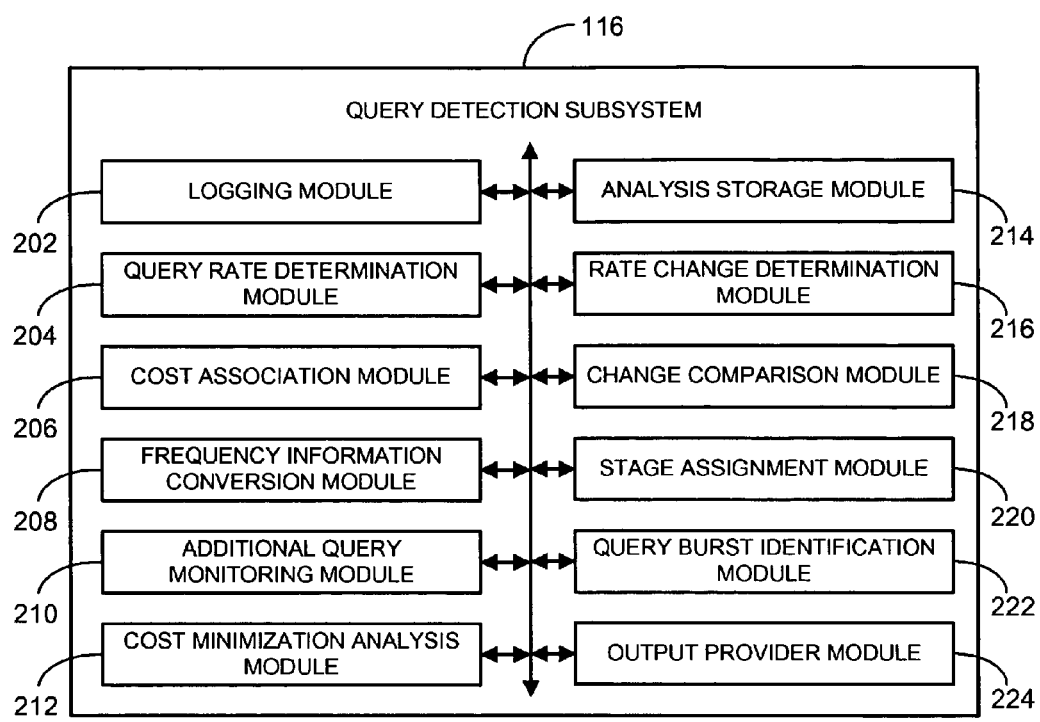
FIG. 2 is a block diagram of an example query detection subsystem that may be deployed within the system of FIG. 1 according to an example embodiment.

FIG. 2 illustrates an example query detection subsystem 116 that may be deployed in the provider 106 and/or the client machine 102 of the system 100 (see FIG. 1) or otherwise deployed in another system. The query detection subsystem 116 may include a logging module 202, a query rate determination module 204, a cost association module 206, a frequency information conversion module 208, an additional query monitoring module 210, a cost minimization analysis module 212, an analysis storage module 214, a rate change determination module 216, a change comparison module

218, a state assignment module 220, a query burst identification module 222, and/or an output provider module 224. Other modules may also be included.

The logging module 202 logs a number of queries to the data source 108. The logging may be stored in the query log 114 or may be otherwise retained.

The query rate determination module 204 determines a rate of queries to the data source 108 for each time period of a number of time periods. The queries may be associated with a term. The determination of the rate may be based on the logging of the queries. A time period may be a day or a longer or shorter period of time. A period of time associated may be, by way of example, a period of three months or a period of five months. However, other periods of time may also be used.

The cost association module 206 associates a cost with a normal query state, normal-to-deviated query state transition, a deviated query state, and/or a deviated-to-normal query state transition. In an example embodiment, the cost may be associated in an amount that prevents oscillation between a normal query state and a deviated query state. The cost association module 206 may be implemented as a noise filter or may be otherwise implemented.

The frequency information conversion module 208 converts frequency information for a particular query into a time series. The frequency information may be daily frequency information or frequency information for a different time period. The time series may indicate timestamps of the arrival of the queries associated with a term.

The additional query monitoring module 210 monitors additional queries to the data source. The additional queries may be associated with the term. The cost minimization analysis module 212 performs cost minimization analysis on the queries for a number of time periods and/or additional queries for an additional time period. The cost minimization may be using a Hidden Markov Models or through a different analysis.

The analysis storage module 214 stores a result of the performing cost minimization analysis. The rate change determination module 216 determines a rate of change of percentage volume for the additional queries to the data source.

The change comparison module 218 compares the rate of change of percentage volume for the additional queries associated to a rate of change of absolute volume for the additional queries associated.

The state assignment module 220 assigns a normal query state or a deviated query state to a particular query on a time period and/or for an additional time period. The normal query state may reflect a normal frequency of queries and/or a normal volume of queries (e.g., to the data source 108, for a particular category, etc.). The deviated query state may reflect a deviated frequency of queries and/or a deviated volume of queries.

The assignment may be based on the rate of queries for the time period, frequency information, a normal query state cost, a normal-to-deviated query state transition cost, a deviated query state cost, a deviated-to-normal query state transition cost, the cost minimization analysis, the comparing performed by the change comparison module, and/or the converting of the frequency information. In an example embodiment, a state machine may be used to assign the normal or the deviated query state for a query.

The query burst identification module 222 identifies a query burst during the time periods and/or an additional time period. The identification may be based on assignment of the normal query state or the deviated query state to the queries and/or a particular query. The query burst may have a normal query state, a normal-to-deviated query state transition, and a deviated query state during a time period, or may have a normal query state, a normal-to-deviated query state transition, a deviated query state, and a deviated-to-normal query state transition during a time period.

The output provider module 224 provides an output. The output may include identification of the query burst. The output may be based on a determination of the rate of the queries and/or on assignment of the normal query state or the deviated query state. The output may include, by way of example, a display of a rate change, a histogram of a popularity sort, or the like. Other outputs may also be provided.

Figure 3:
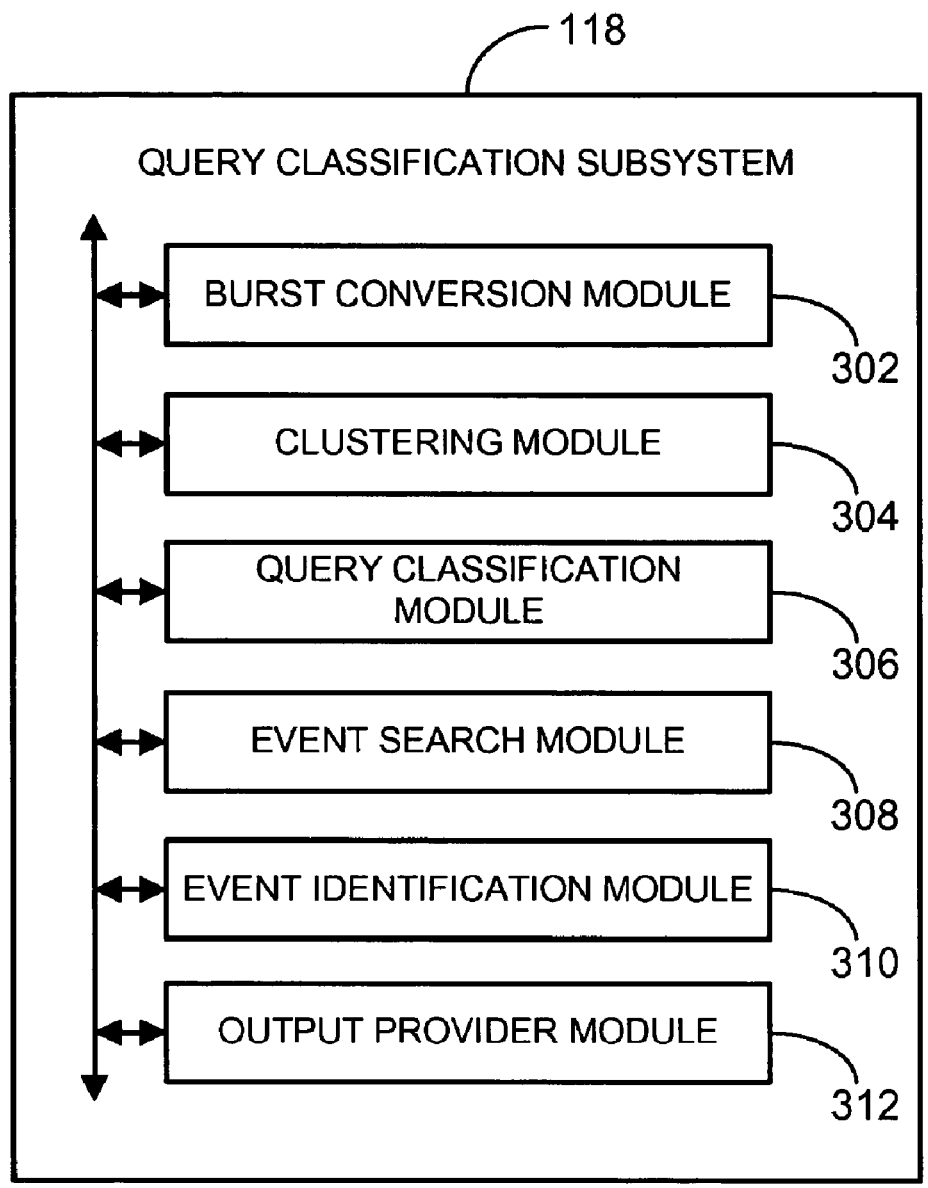
FIG. 3 is a block diagram of an example query classification subsystem that may be deployed within the system of FIG. 1 according to an example embodiment.

FIG. 3 illustrates an example query classification subsystem 118 that may be deployed in the provider 106 and/or the client machine 102 of the system 100 (see FIG. 1) or otherwise deployed in another system. The query classification subsystem 118 may include a burst conversion module 302, a clustering module 304, a query classification module 306, an event search module 308, an event identification module 310, and/or an output provider module 312. Other modules may also be included.

The burst conversion module 302 converts the query burst (e.g., to a wavelet) using a wavelet transform. The query burst may be associated with an unexpected event or may otherwise occur. Examples of wavelet transforms include a Daubechies transform and a Haar transform; however, other transforms may also be used.

The clustering module 304 applies a clustering technique to a result of the conversion of the query burst (e.g., a wavelet). For example, a distance (e.g., a Euclidean distance) between the wavelet and multiple centroids may be calculated. A centroid may be associated with a particular class of the classification. The clustering technique may be, by way of example, a K-means clustering technique. However, other clustering techniques may also be used. The K of the K-means clustering technique may be four, however other numbers including two, three, five, six, seven, or more than seven may also be used.

The query classification module 306 classifies the query burst based on application of the clustering technique by the clustering module. The classification of the query burst may be based on a minimum distance between the wavelet and the multiple centroids. An example classification of the query burst may be very surprising, moderately surprising, slightly surprising, and trend evolution. However, other classifications with more or less elements may also be used.

The event search module 308 searches multiple events (e.g., external events) on one or more days associated with the query burst. The events may include, by way of example, a news item, a launch of a product, a landmark television episode, an expected occasion, or an advertising campaign. Other events may also be searched.

The event identification module 310 identifies a particular event based on the classification. The identification of the particular event may be based on the search of the events.

The output provider module 312 provides an output. The output may include identification of a particular event.

Figure 4:
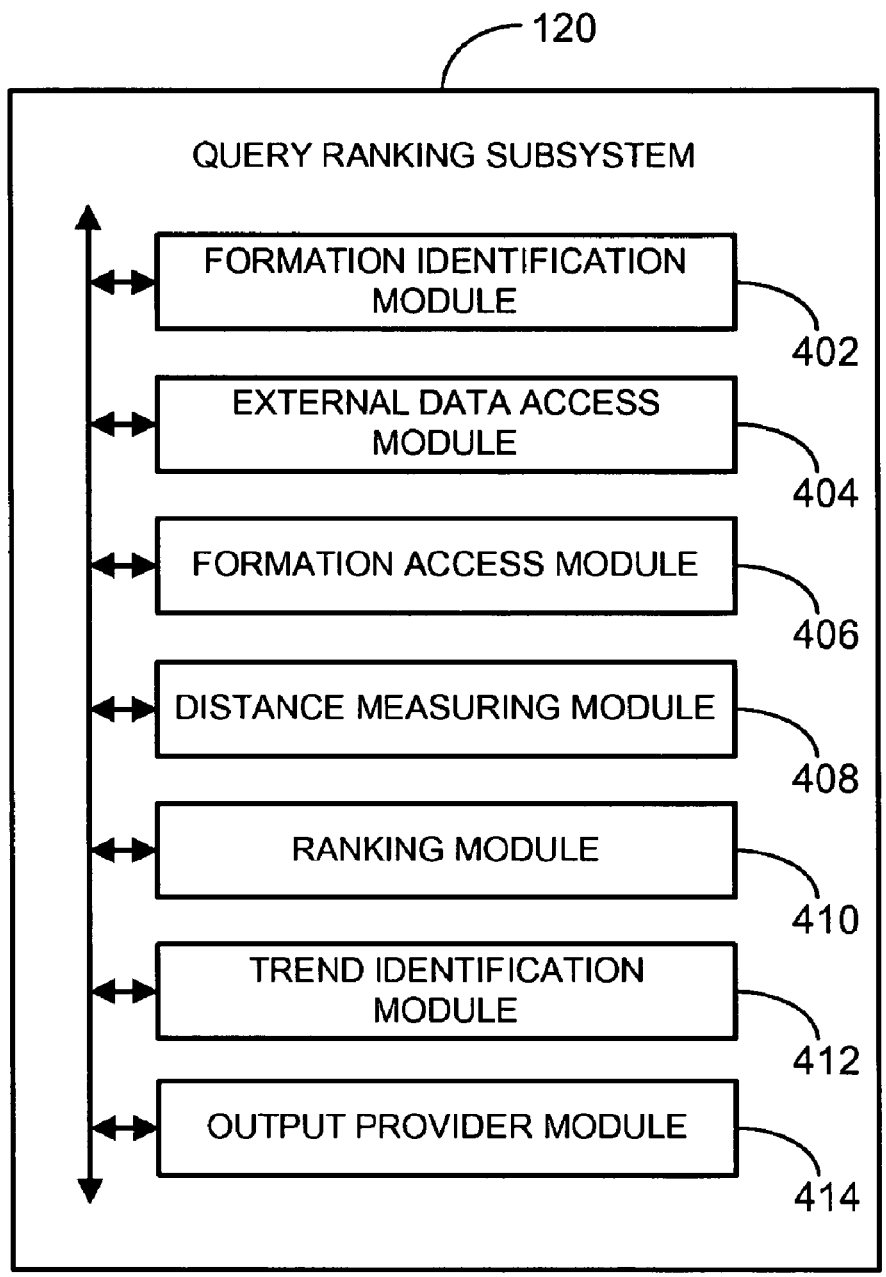
FIG. 4 is a block diagram of an example query ranking subsystem that may be deployed within the system of FIG. 1 according to an example embodiment.

FIG. 4 illustrates an example query ranking subsystem 120 that may be deployed in the provider 106 and/or the client machine 102 of the system 100 (see FIG. 1) or otherwise deployed in another system. The query ranking subsystem 120 may include a formation identification module 402, an external data access module 404, a formation access module 406, a distance measuring module 408, a ranking module 410, a trend identification module 412, and/or an output provider module 414. Other modules may also be included.

The formation identification module 402 identifies a graphic query formation (e.g., a waveform) among the queries based on the query burst. The external data access module 404 accesses external data. The external data may include, by way of example, a news article, user activity, a newly listed item, or the like. The formation access module 406 accesses a comparison graphic query formation.

The distance measuring module 408 measures a distance between the graphic query formation and the comparison graphic query formation. The ranking module 410 ranks the query burst based on the graphic query formation, a comparison graphic query formation, a distance, and/or external data. The trend identification module 412 identifies a trend based on the graphic query formation.

The output provider module 414 be provides an output. The output may include a ranking of the query burst and/or identification of the trend.

Figure 5:
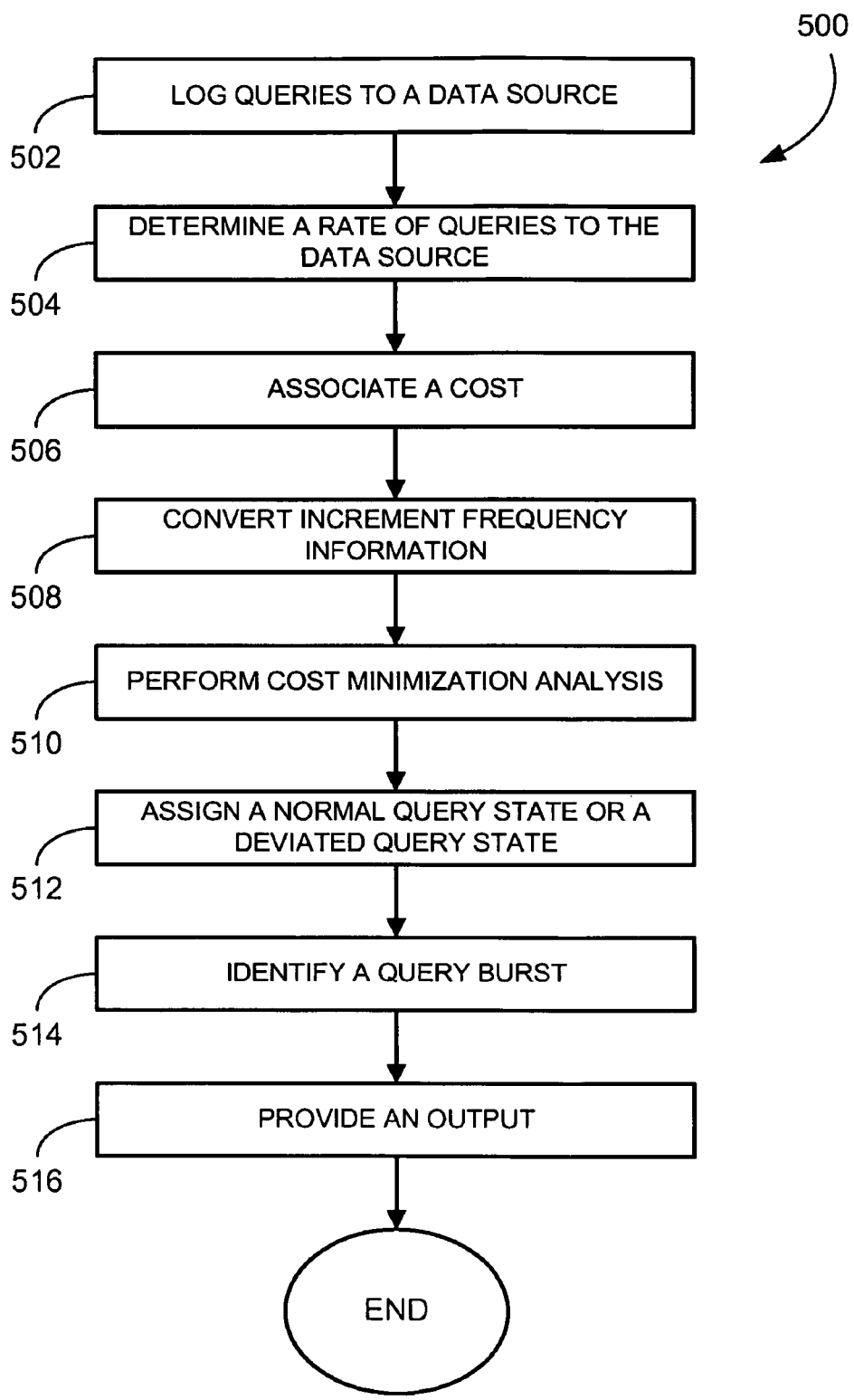
FIG. 5 is a flowchart illustrating a method for query detection according to an example embodiment.

FIG. 5 illustrates a method 500 for query detection according to an example embodiment. The method 500 may be performed by the provider 106 and/or the client machine 102 of the system 100 (see FIG. 1) or otherwise performed.

The number of queries to the data source 108 may be logged at block 502. The queries may be logged to the query log 114 or may otherwise be logged. The queries may be for a single category of information or for multiple categories of information. The queries may be logged for three month, five months, or a shorter or longer period of time.

A rate of a number of queries to the data source 108 is determined for a number of time periods at block 504. The queries may be associated with a term. The determination of the rate may be based on the logging of the queries.

In an example embodiment, the queries for which the rate is determined may be limited. For example, queries that occur in the top 2000 queries during any day of a 3 month period or queries in the top 8000 queries for any day of the 5 month period may be used. However, different numbers of queries during different time periods may be used. In addition, the queries need not be limited.

The number of time periods may be a number of days or a different amount of time period. The rate may be determined during a three month period, a five month period, or a greater or lesser period of time.

A cost is associated with a normal query state, a normal-to-deviated query state transition, a deviated query state, and/or a deviated-to-normal query state transition at block 506. The normal query state cost, the normal-to-deviated query state transition cost, the deviated query state cost, and/or the deviated-to-normal query state transition cost may be zero-cost or a non-zero cost.

The associated cost may be determined based on a recurrence relation. The costs may include the cost of conforming to a state and the cost of moving from one state to another state. The conformance cost may be determined based on a threshold rate. The cost of moving from one state to another state or staying in the same state may vary and could, in an example embodiment, be zero.

Frequency information for a query may be converted into a time series at block 508. The time series may indicate timestamps (e.g., UNIX timestamps) of the arrival of the queries associated with the term. In an example embodiment, the time series may be representative of the arrival rate of the query. The time series for every query may be converted to a series of inter-arrival times (e.g., gaps) between queries.

In an example embodiment, the query set may not have any information about times of day when the query was received; it may only have accumulated information about the number of times the particular query happened per day. The information may be converted to a time series by assuming that the arrival rate of query per day is uniform (e.g., a query with a frequency of 2880 per day would have one query arrival every 30 seconds for that particular day in the corresponding time series).

Cost minimization analysis may be performed on the queries at block 510. A normal query state or a deviated query state is assigned to a query on a time period at block 512. The assignment may be based on the rate of queries for the time period, cost minimization analysis, conversion of the frequency information, a normal query state cost, the normal-to-deviated query state transition cost, a deviated query state cost, and/or a deviated-to-normal query state transition cost.

At block 514, a query burst is identified during the time periods based on assignment of the normal query state or the deviated query state to the queries. The query burst may have during a time period the normal query state, the normal-to-deviated query state transition, and the deviated query state. The query burst may further have during the time period the deviated-to-normal query state transition.

In an example embodiment, thresholds may be used for the rates pertaining to normal query state and the deviated query state (e.g., the higher query state). The threshold rate that may be used for normal query state may be an average frequency of query over a window of x days (e.g., 30 days, more than 30 days, or less than 30 days). The threshold rate used for deviated query state may be y times that of the normal state (e.g., y=2.5, more than 2.5, or less than 2.5). Based on characteristics of the query and cost considerations, the query may be assigned a particular state.

In an example embodiment, a 2-state automaton based generative model characterized by a "low rate" state ($q_0$) and a "high rate" state ($q_1$) may be adopted to implement the method 500. A start may be made in the low rate state $q_0$. When the automaton is in $q_0$, queries arrive at a slow rate, with gaps x between consecutive query arrivals distributed independently according to a memoryless exponential density function $f_0(x)=\alpha_0 e^{-\alpha_0 x}$ and when the automaton is in $q_1$, queries arrive at a faster rate, with gaps between query arrivals distributed independently according to $f_1(x)=\alpha_1 e^{-\alpha_1 x}$, where $\alpha_1 > \alpha_0$. The automaton changes state with probability $p \in (0, 1)$, remaining in its current state with probability $1-p$, independently of previous query arrivals and state changes. This may model the cost associated with a state jump.

The generative model may then be applied to find a likely state sequence, given a set of query arrivals. With a given set of n+1 query arrivals, with specified arrival times, a sequence of n inter-arrival gaps $X=(x_1, x_2, \ldots, x_n)$, where $x_i > 0$. Let $Q=(q_{i_1}, q_{i_2}, \ldots, q_{i_n})$ may be determined to be a state sequence. Each state sequence Q may induce a density function $f_Q$ over sequences of gaps, which has the form $f_Q(x_1, x_2, \ldots x_n) = \pi_{t=1}^n f_{i_t}(x_t)$. If b denotes the number of state transitions in the sequence Q—that is, the number of indices $i_t$ where $q_{i_t} \neq q_{i_{t+1}}$—then the prior probability of Q may be equal to $$\left(\prod_{i_t \neq i_{t+1}} p\right)\left(\prod_{i_t = i_{t+1}} 1-p\right) = p^b(1-p)^{n-b} = \left(\frac{p}{1-p}\right)^b (1-p)^n.$$

Let $i_0=0$, since the automaton may start in $q_0$. Then, the conditional probability of a state sequence Q given inter-arrival gaps X is given using Bayes Theorem as $$Pr[Q|X] = \frac{Pr[Q]f_Q(X)}{\sum_{Q'} Pr[Q']f_{Q'}(X)} = \frac{1}{Z}\left(\frac{p}{1-p}\right)^b (1-p)^n \prod_{t=1}^{n} f_{i_t}(x_t)$$

where Z is the normalizing constant $\Sigma_Q Pr[Q']f_Q(X)$. Finding a state sequence Q maximizing this probability may be equivalent to finding one that minimizes $$-\ln Pr[Q|X] = b\ln\left(\frac{1-p}{p}\right) + \left(\sum_{t=1}^{n} -\ln f_{i_t}(x_t)\right) - n\ln(1-p) + \ln Z.$$

Since the third and fourth terms are independent of the state sequence, the problem may be equivalent to finding a state sequence Q that minimizes the following cost function:

$$C(Q|X) = b \cdot \ln\left(\frac{1-p}{p}\right) + \left(\sum_{t=1}^{n} -\ln f_{i_t}(x_t)\right).$$

The state sequence that minimizes this cost may depend firstly on how easy it is to jump from one state to another (transition cost) and secondly on how following that sequence would conform well to the rates of query arrivals.

There are 3 parameters which may be controlled to tune the behavior of this automaton model; the low rate of arrival $\alpha_0$, the high rate of arrival $\alpha_1$ and the cost of jumping from one state to another in the automaton vs. staying in the same state which we denote as the cost C.

By way of an example, a query "ipod" may be low frequency and in a normal query state. As its frequency increases, its conformance cost for deviated query state (High Rate) goes down and conformance cost for normal query state goes up. However, if the transition cost from normal to deviated state is high it may still remain in normal state although its frequency increased, because the method cannot afford the cost of moving it to the deviated query state. If the frequency further increased and its conformance cost to deviated query state became very, very low and conformance cost to normal query state became very, very high, the method might be able to move it to deviated query State (because the addition of conformance cost for deviated query state+transition cost from normal to deviated state now becomes less than the conformance cost for normal query state+cost of staying from normal query State to normal query state.

The state assignment may be performed based on the addition of these costs, and the query state may be assigned to the state which has a least cost (e.g., maximum benefit).

An output may be provided at block 516. The output may include identification of the query burst. The output may be based on a determination of the rate of the queries and/or on assignment of the normal query state or the deviated query state. The output may include, by way of example, a display of a rate change, a histogram of a popularity sort, or the like. Other outputs may also be provided.

Figure 6:
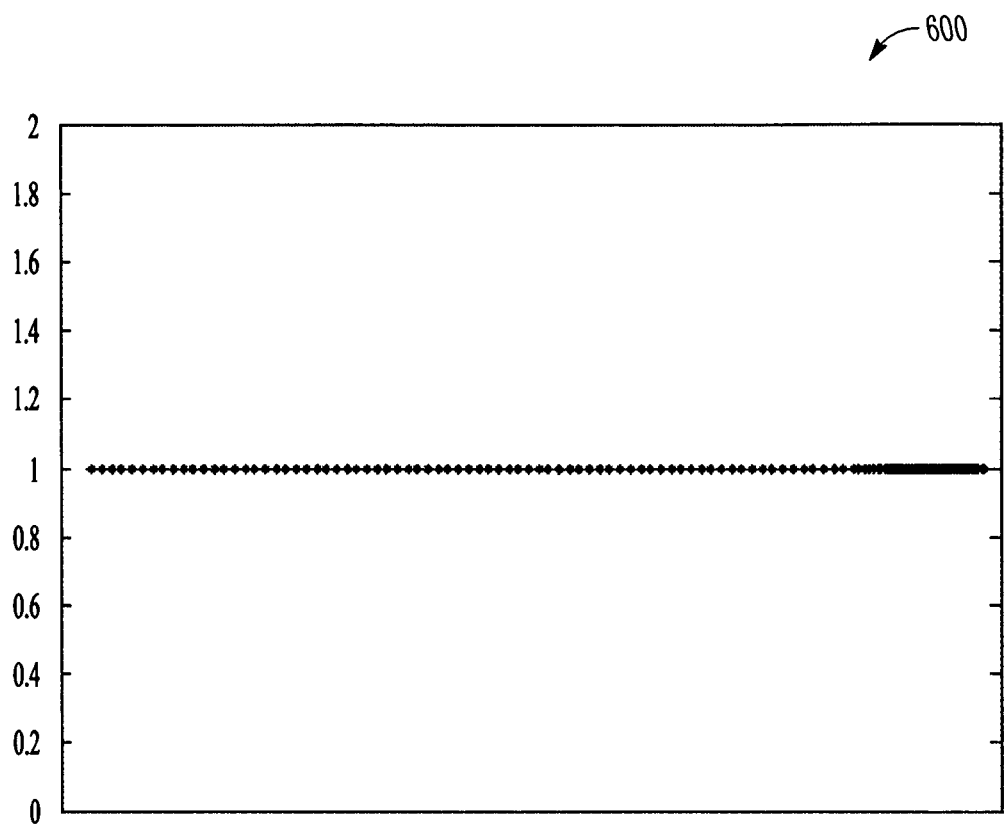
FIGS. 6-8 are example graphs according to an example embodiment.

FIG. 6 illustrates a graph 600 for an example time series according to an example embodiment. While the graph 600 is shown for the term 'iphone', other graphs may be used to show the same time series. Other query terms may also be represented by a time series.

The Y-axis of the graph 600 may include a constant magnitude of 1 (e.g., indicating presence in the sample). The X axis of the graph 600 may be the time axis with absolute time labeling omitted. The graph 600 presents points that are denser towards the end indicating higher frequency of the query during that time period.

Figure 7:
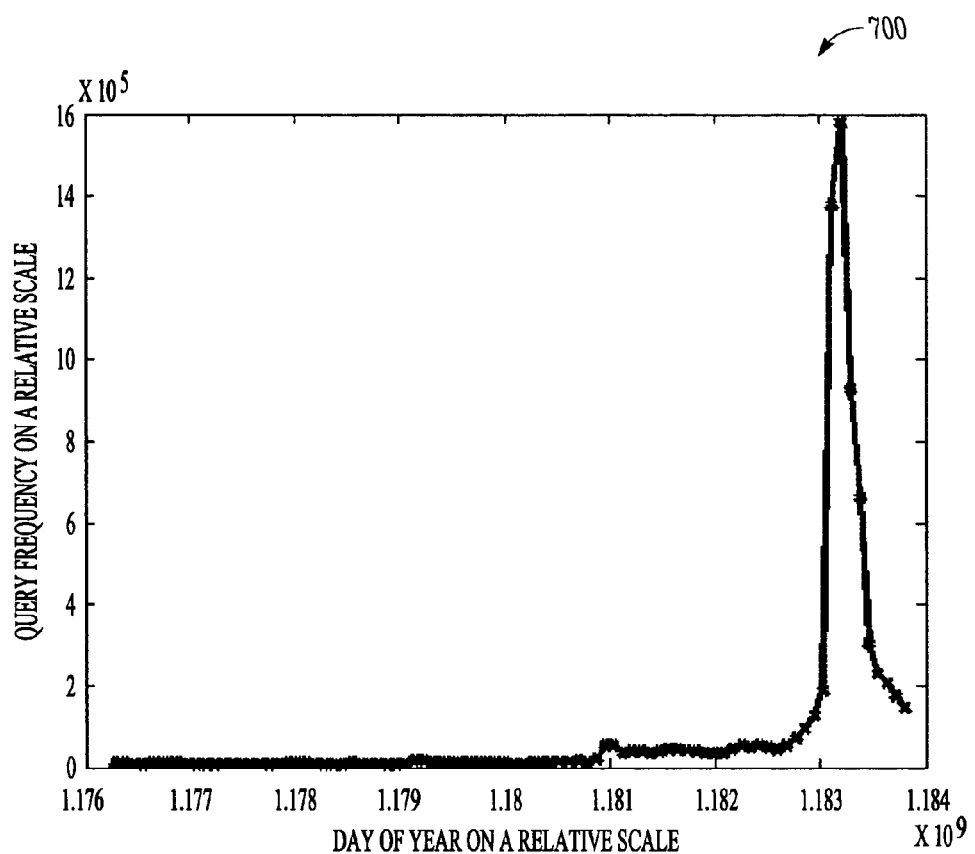

FIG. 7 illustrates a graph 700 for an example daily frequency. While the graph 700 is shown for the term 'iphone' during the same time period as the graph 600 (see FIG. 6), other graphs may be used to show the same daily frequency. The graph 700 shows a peak towards the end of the graph 700. The Y axis of the graph 700 shows query frequency (e.g., on an arbitrary scale).

Figure 8:
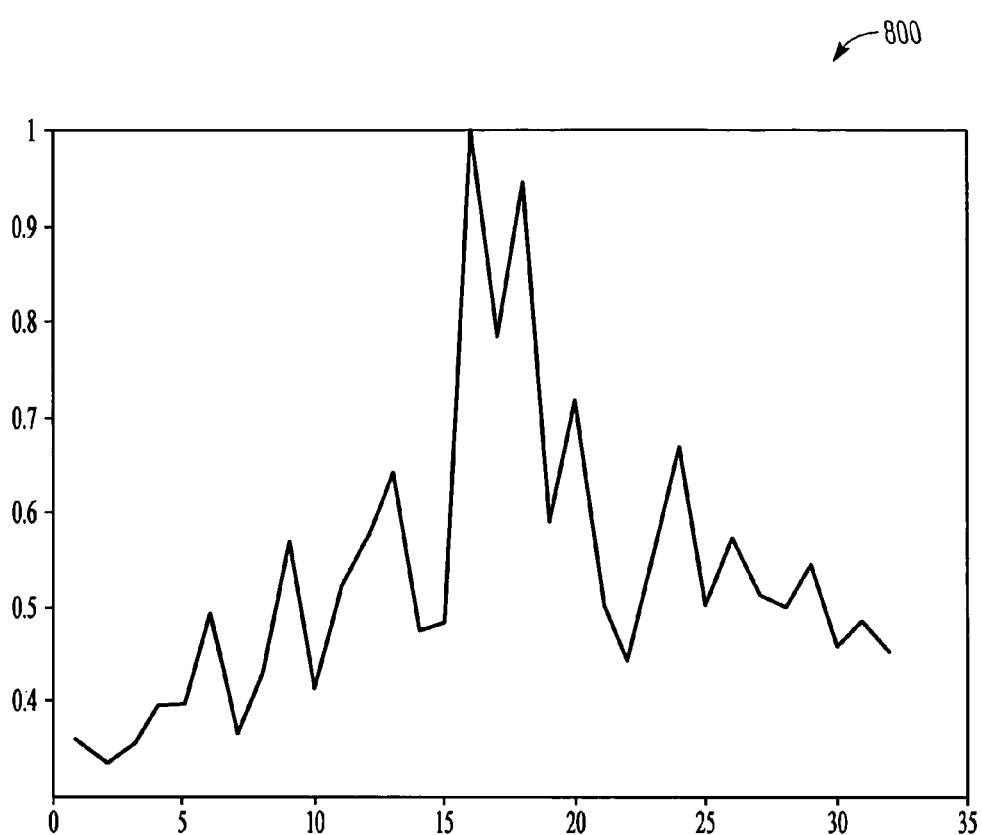

FIG. 8 illustrates a graph 800 for a time varying waveform. While the graph 800 is shown for the term 'John Wayne' over a 32 day period, other graphs may be used to show time varying waveforms for a same time period or a different time period. The peak in the middle of the graph 800 may identify the query burst (e.g., a surprise period). The amplitude of the graph 800 is shown as being normalized to between 0 and 1.

Figure 9:
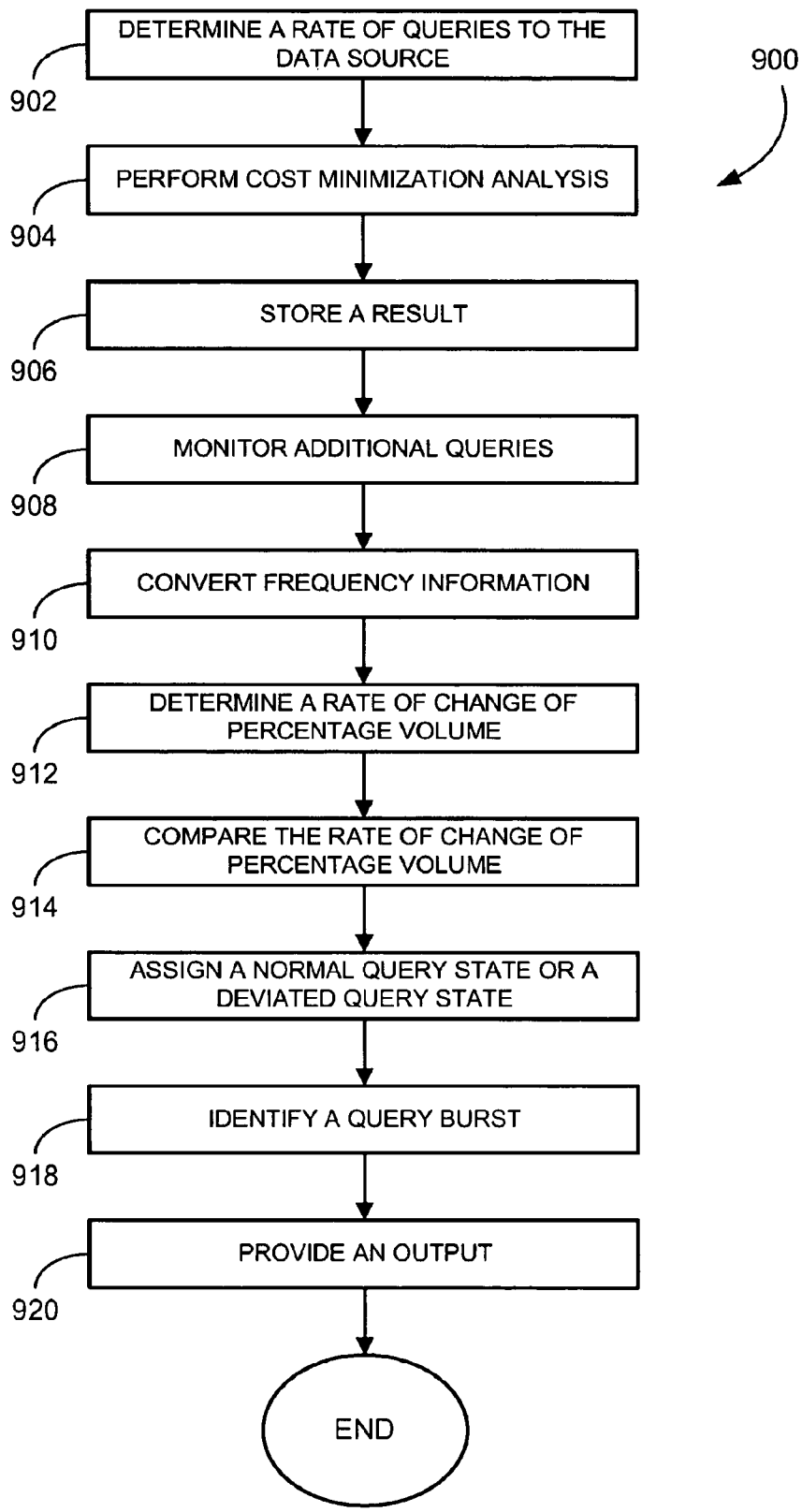
FIGS. 9 and 10 are flowcharts illustrating a method for query detection according to an example embodiment.

FIG. 9 illustrates a method 900 for query detection according to an example embodiment. The method 900 may be performed by the provider 106 and/or the client machine 102 of the system 100 (see FIG. 1) or otherwise performed.

A rate of a plurality of queries to the data source 108 is determined for a plurality of time periods at block 902. The queries may be associated with a term. Cost minimization analysis may be performed on the queries for the time periods at block 904.

A result of the performing cost minimization analysis is stored at block 906. A number of additional queries to the data source are monitored at block 908. The additional queries may be associated with the term.

Frequency information for the particular query may be converted into a time series at block 910. The time series may indicate timestamps of the arrival of the additional queries associated with the term.

A rate of change of percentage volume for the additional queries to the data source may be determined at block 912. The rate of change of percentage volume for the additional queries may be compared to a rate of change of absolute volume for the additional queries at block 914.

At block 916, a normal query state or a deviated query state is assigned to a query for the additional time period based on the conversion of the frequency information, the comparison, and/or the additional queries. At block 918, a query burst is identified during the time periods and the additional time period based on assignment of the normal query state or the deviated query state for the query.

An output may be provided at block 920. The output may include identification of the query burst. The output may be based on a determination of the rate of the queries and/or on assignment of the normal query state or the deviated query state. The output may include, by way of example, a display of a rate change, a histogram of a popularity sort, or the like. Other outputs may also be provided.

Figure 10:
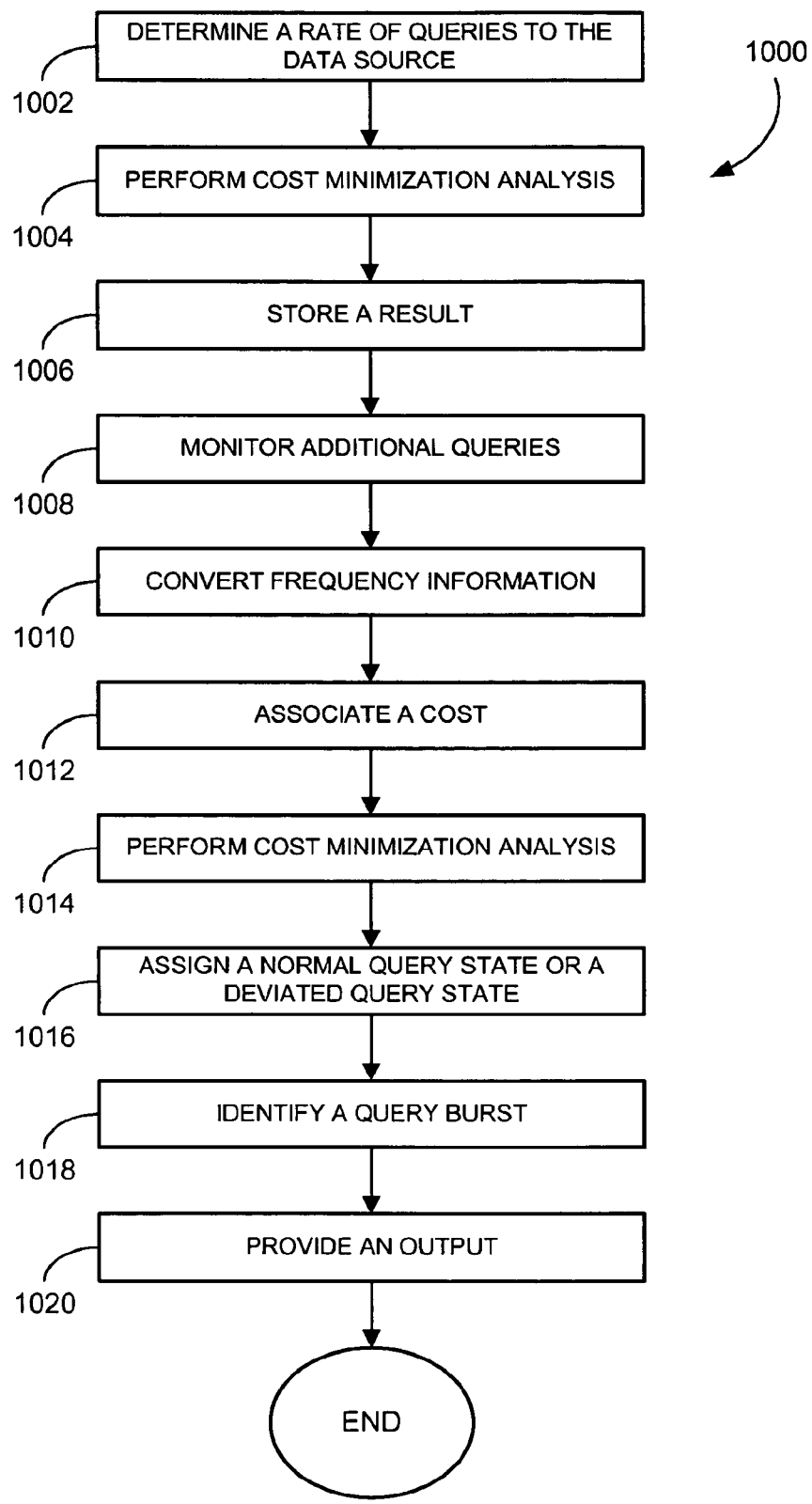

FIG. 10 illustrates a method 1000 for query detection according to an example embodiment. The method 1000 may be performed by the provider 106 and/or the client machine 102 of the system 100 (see FIG. 1) or otherwise performed.

A rate of a plurality of queries to a data source is determined for a plurality of time periods at block 1002. The queries may be associated with a term.

Cost minimization analysis may be performed on the queries for the time periods at block 1004.

A result of the performing cost minimization analysis is stored at block 1006. A number of additional queries to the data source 108 are monitored at block 1008. The additional queries may be associated with the term.

Frequency information for the particular query may be converted into a time series at block 1010. The time series may indicate timestamps of the arrival of the additional queries associated with the term.

A cost may be associated with a normal query state, a normal-to-deviated query state transition, a deviated query state, and/or a deviated-to-normal query state transition at block 1012. Cost minimization analysis is performed on the additional queries for an additional time period at block 1014.

At block 1016, a normal query state or a deviated query state is assigned to a query for the additional time period based on the cost minimization analysis performed on the queries, the conversion of the frequency information, a normal query state cost, a normal-to-deviated query state transition cost, a deviated query state cost, a deviated-to-normal query state transition cost, and/or the additional queries.

At block 1018, a query burst is identified during the time periods and the additional time period based on assignment of the normal query state or the deviated query state for the query.

An output may be provided at block 1020. The output may include identification of the query burst. The output may be based on a determination of the rate of the queries and/or on assignment of the normal query state or the deviated query state. The output may include, by way of example, a display of a rate change, a histogram of a popularity sort, or the like. Other outputs may also be provided.

Figure 11:
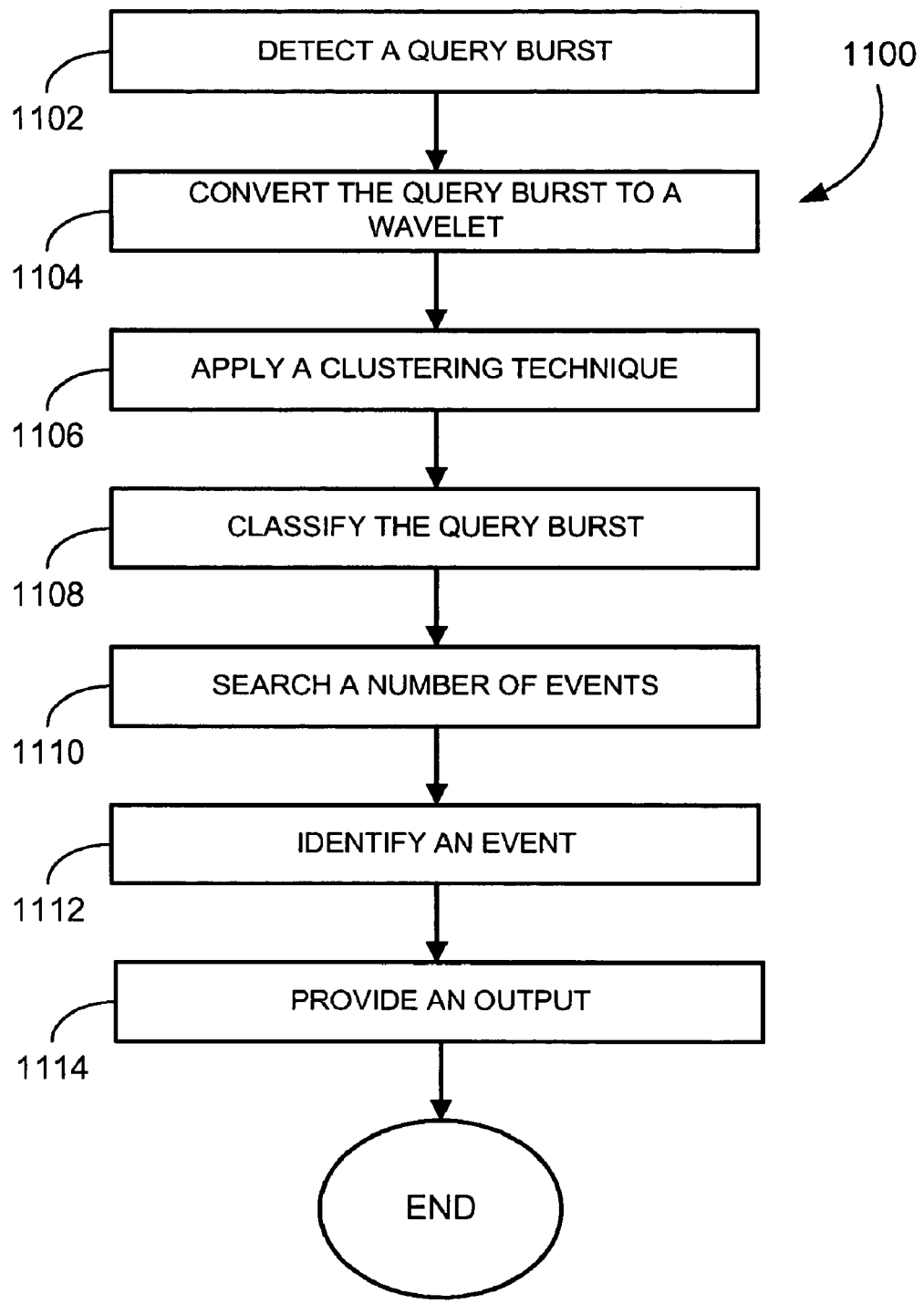
FIG. 11 is a flowchart illustrating a method for query classification according to an example embodiment.

FIG. 11 illustrates a method 1100 for query classification according to an example embodiment. The method 1100 may be performed by the provider 106 and/or the client machine 102 of the system 100 (see FIG. 1) or otherwise performed.

A query burst is detected among queries to the data source 108 at block 1102. The query burst may be associated with an expected event or an unexpected event.

In an example embodiment, the query burst may be detected by detecting a number of available query bursts among the plurality of queries to the data source and selecting the query burst of the available query bursts based on a qualification criterion. The qualification criterion may include, by way of example, a particular geographic area, a particular category, a particular number of queries, a particular application, or the like. Other qualification criterion may be used.

The query burst is converted (e.g. to a wavelet) using a wavelet transform at block 1104. The wavelet transform may be, by way of example, a Daubechies transform or a Haar transform. However, other transforms may also be used.

A clustering technique is applied to a result of the conversion of the query burst (e.g., the wavelet) at block 1106. The clustering technique may be, by way of example, a K-means clustering technique. However, other clustering techniques may also be used. The K of the K-means clustering technique may be four, however other numbers including two, three, five, six, seven, or more than seven may also be used.

In an example embodiment, a distance (e.g., a Euclidean distance) between the wavelet and a number of centroids may be calculated. A particular centroid may be associated with a particular class of the classification.

The query burst is classified based on the applying of the clustering technique at block 1108. The classification of the query burst may be based, in an example embodiment on a minimum distance between the wavelet and the centroids.

The query burst may, in an example embodiment, be classified as very surprising, moderately surprising, slightly surprising, and trend evolution. However, other classifications may also be used.

A number of events (e.g., external events) on one or more days associated with the query burst may be searched at block 1110. The events may include a news item, a launch of a product, a landmark television episode, an expected occasion, an advertising campaign, or the like. A particular event may be identified based on the classification and/or the searching of the events at block 1112.

An output may be provided at block 1114. The output may include identification of the particular event.

FIGS. 12-15 illustrate example tables 1200, 1300, 1400, 1500 for classifications according to an example embodiment. While the tables 1200, 1300, 1400, 1500 are shown for particular terms, different types of classifications and/or a different number of classifications may be used. Other terms may also be represented by the graphs.

The tables 1200, 1300, 1400, 1500 may be the result of unsupervised clustering using a K-means clustering technique. The distances between surprises and cluster centroids may be measured A K of four was used to provide a distribution and classes of query burst. A hillclimbing based K means technique iterated a number of times to converge to its local optimum. The K-means clustering technique may, by way of example, classify three hundred and fifty query bursts into four classes.

The tables 1200, 1300, 1400, 1500 identify four classes based upon the three hundred and fifty query bursts using K-means clustering. The tables 1200, 1300, 1400, 1500 include a series of graphs where the X axis indicates day of year and Y axis indicates query frequency on a relative scales. The query bursts of the tables 1200, 1300, 1400, 1500 may be found in different classes or in the same class multiple times. The findings may correspond to different periods for the same query burst.

Figure 12:
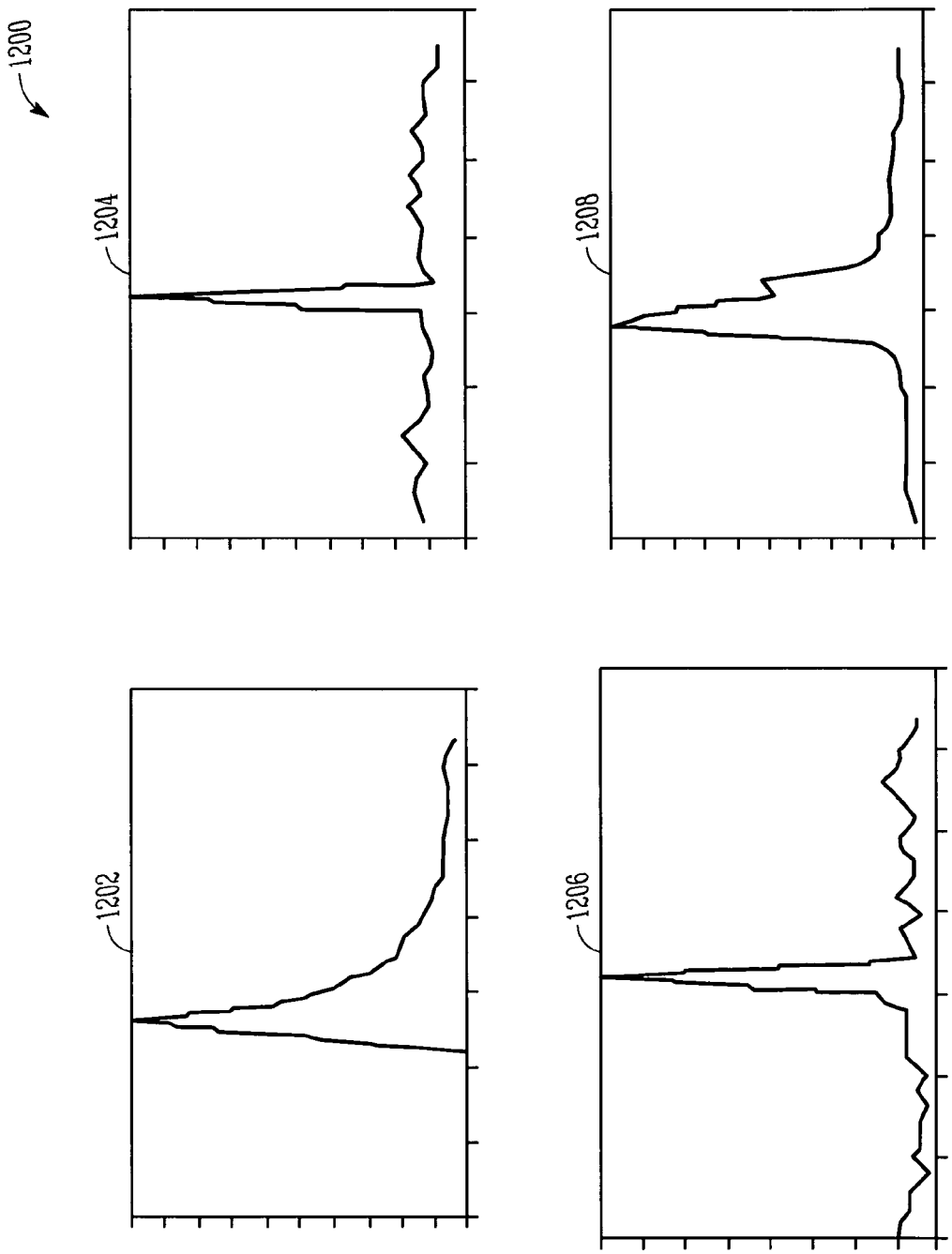
FIGS. 12-15 are example tables according to an example embodiment.

The table 1200 of FIG. 12 may reflect that fifty-four out of the three hundred and fifty query bursts of the example were clustered into a first class. The query bursts of the table 1200 appear as the most surprising with sharp, narrow spikes. The graph 1202 may be for term "chris benoit", the graph 1204 may be for the term "corelle", the graph 1206 may be for the term "alienware", and the graph 1208 may be for the term "apple iphone".

Figure 13:
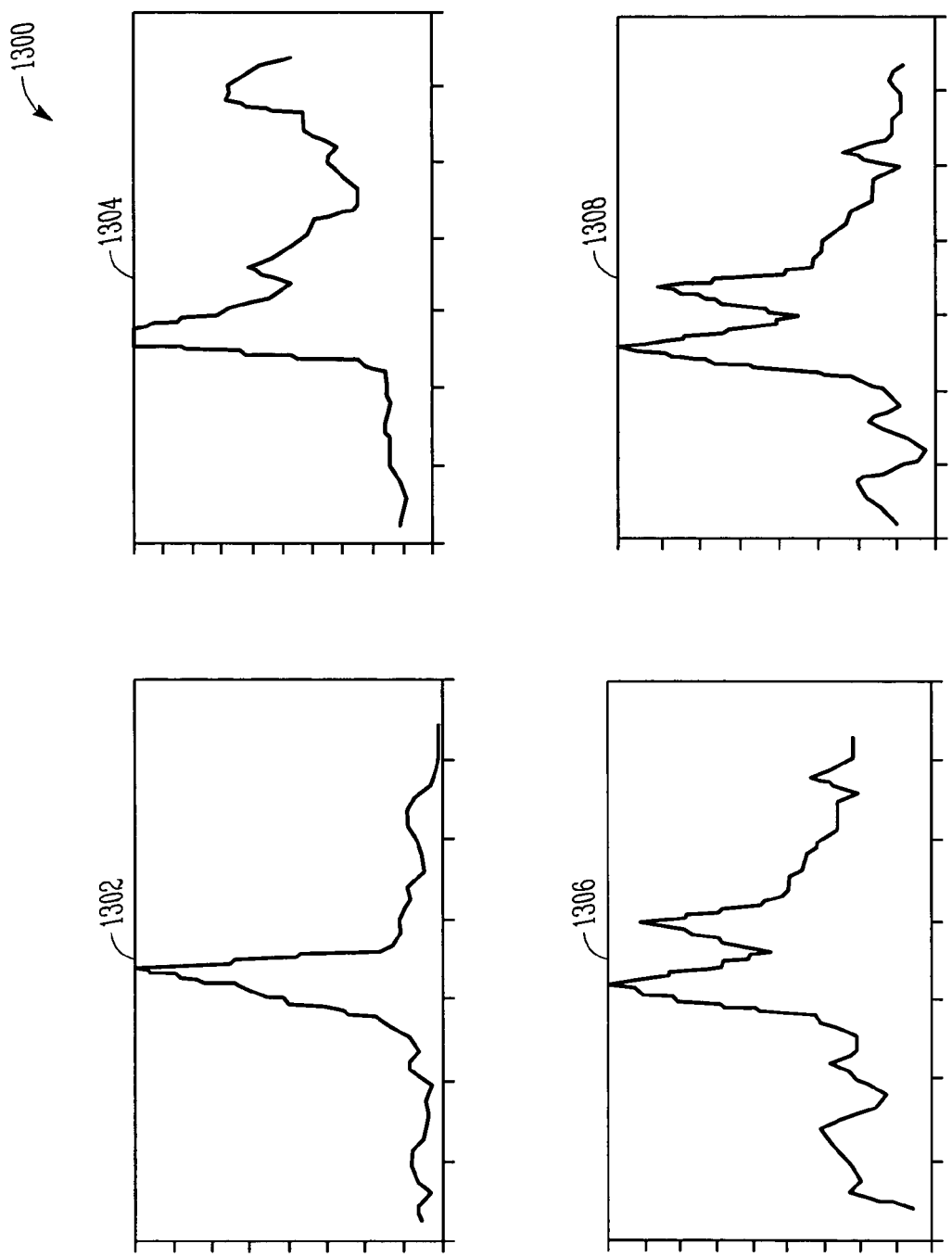

The table 1300 of FIG. 13 may reflect that one hundred and thirty two out of the three hundred and fifty query bursts of the example were clustered into a second class. The query bursts of the table 1300 appear as moderately surprising with broad peaks or dual peaks. The graph 1302 may be for term "24", the graph 1304 may be for the term "anya hindmarch", the graph 1306 may be for the term "alex rodriguez", and the graph 1308 may be for the term "alex rodriguez".

Figure 14:
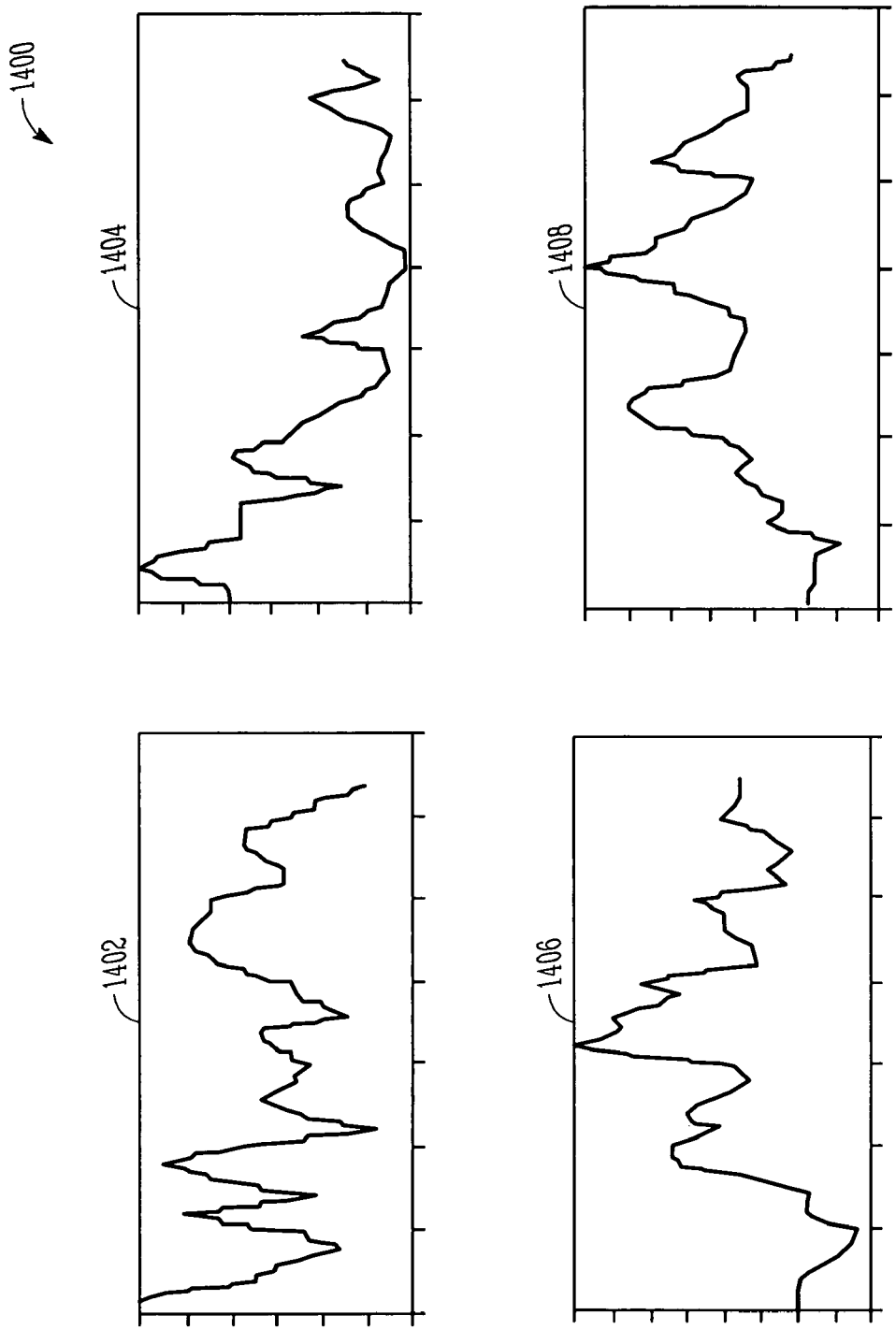

The table 1400 of FIG. 14 may reflect that one hundred and twenty one of the three hundred and fifty query bursts of the example were clustered into a third class. The query bursts of the table 1400 appear as slightly surprising with various peaks and distribution having some elements of uniformity over time. The graph 1402 may be for term "bitten", the graph 1404 may be for the term "alli", the graph 1406 may be for the term "barney", and the graph 1408 may be for the term "blackberry curve".

Figure 15:
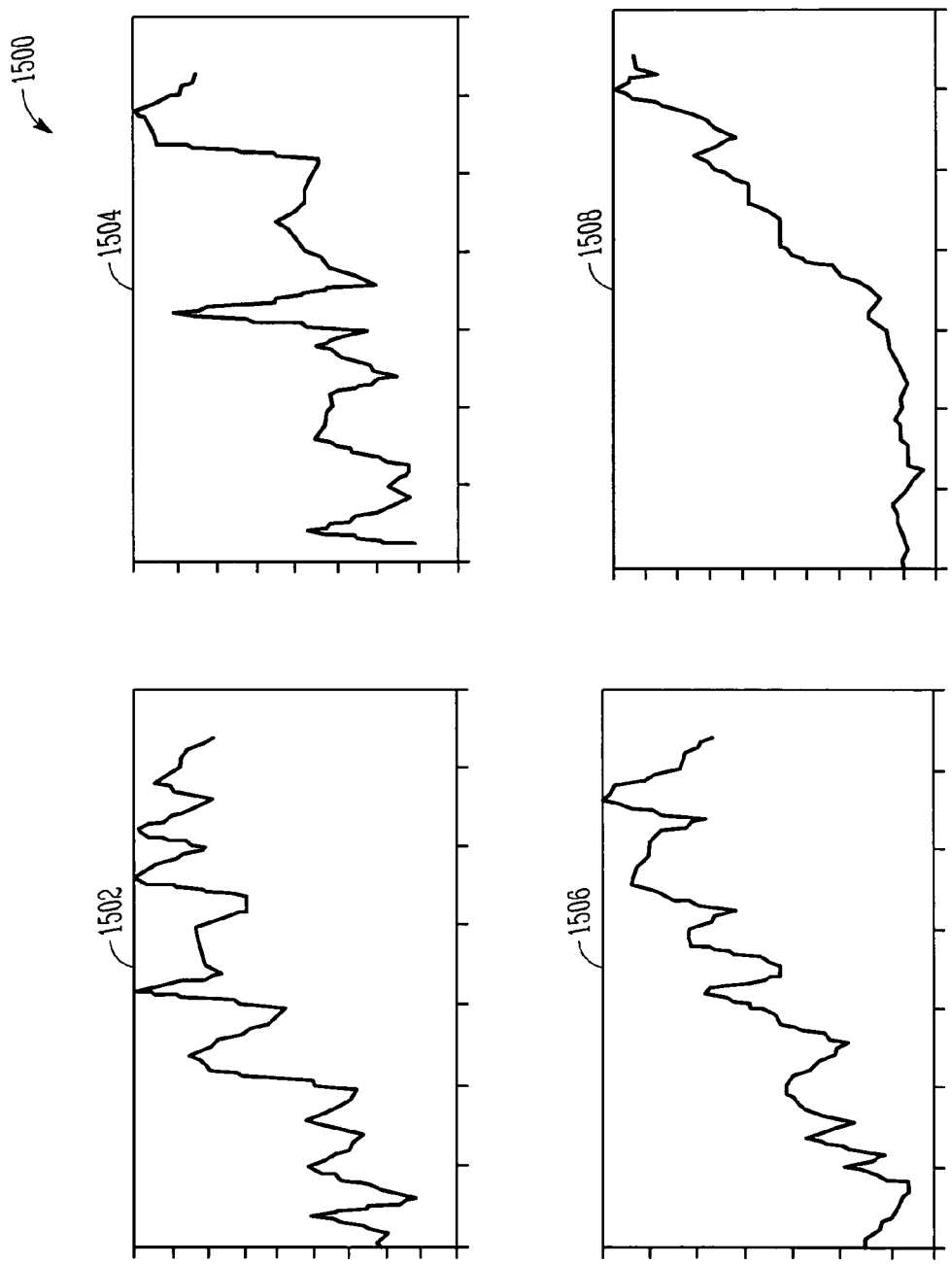

The table 1500 of FIG. 15 may reflect that forty three of the three hundred and fifty query bursts of the example were clustered into a fourth class. The query volume for all the terms of the table 1500 seem to have steadily increased over time as if the query burst was evolving into a trend. The graph 1502 may be for term "350z", the graph 1504 may be for the term "backpacks", the graph 1506 may be for the term "hannah montana", and the graph 1508 may be for the term "bumblebee".

In an example embodiment, the tables 1200, 1300, 1400, 1500 may be used to build a merchandising application that were detects and reacts to query bursts surprises in an online community. For example, the window of opportunity for reaction is the least for the first class, followed by second class, third class, and fourth class respectively.

Figure 16:
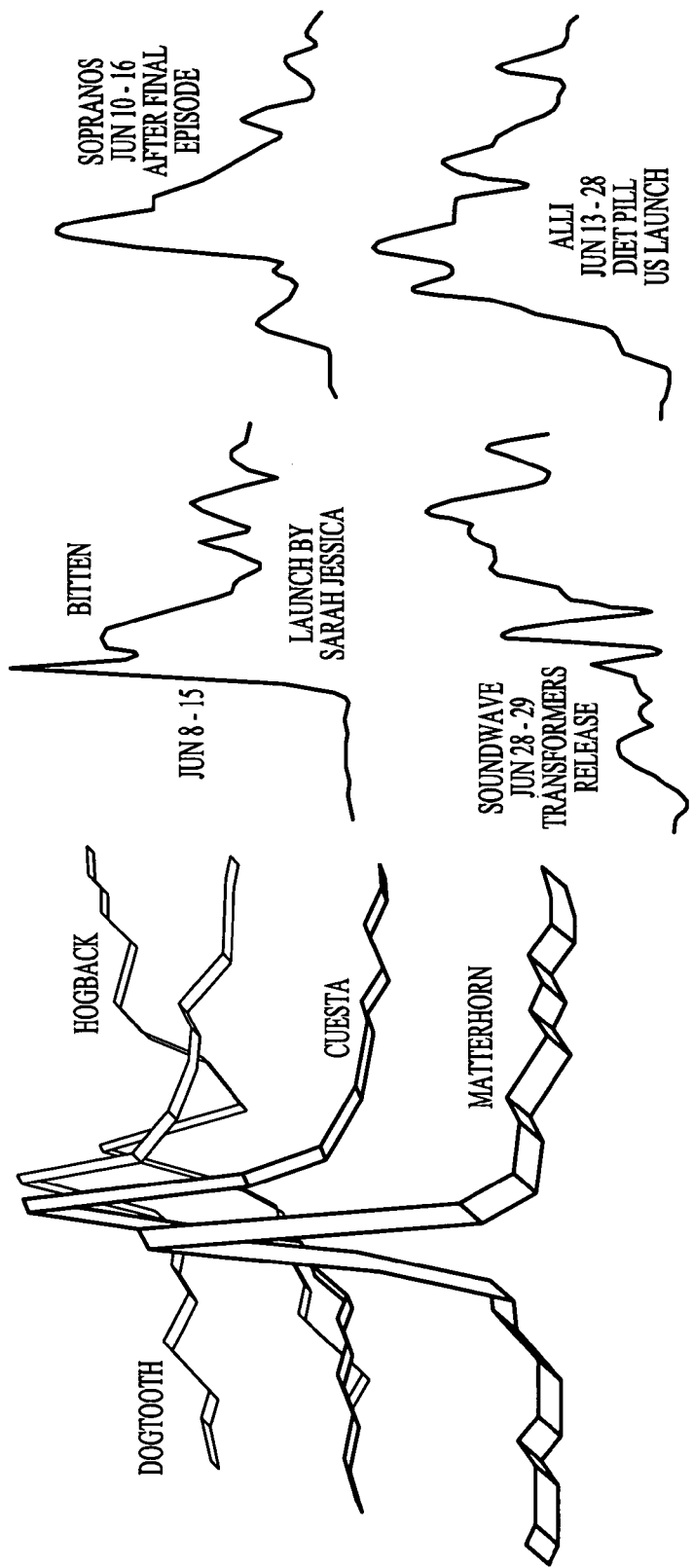
FIG. 16 is an example graph according to an example embodiment.

FIG. 16 illustrates an example graph 1600 that includes a number of classes according to an example embodiment. Other classes may also be used.

The classes of the graph 1600 are named based upon the representative shapes of their centroids. The name of the classes, in the example embodiment, correspond to names and shapes used by Geoscientists to classify peaks of Canadian Rockies to name these classes. The X axis may represent the time axis (e.g., day of the year), with the query burst at the center of the graph 1600. The Y axis may show the relative normalized query frequencies that provides an indication of the differences in amplitudes between query burst and non query burst periods for each of the 4 classes. The example classes with a respective example query include "bitten" as a Matterhorn, "sopranos" as a Cuesta, "alli" as a Dogtooth and "soundwave" as a Hogback surprise.

Figure 17:
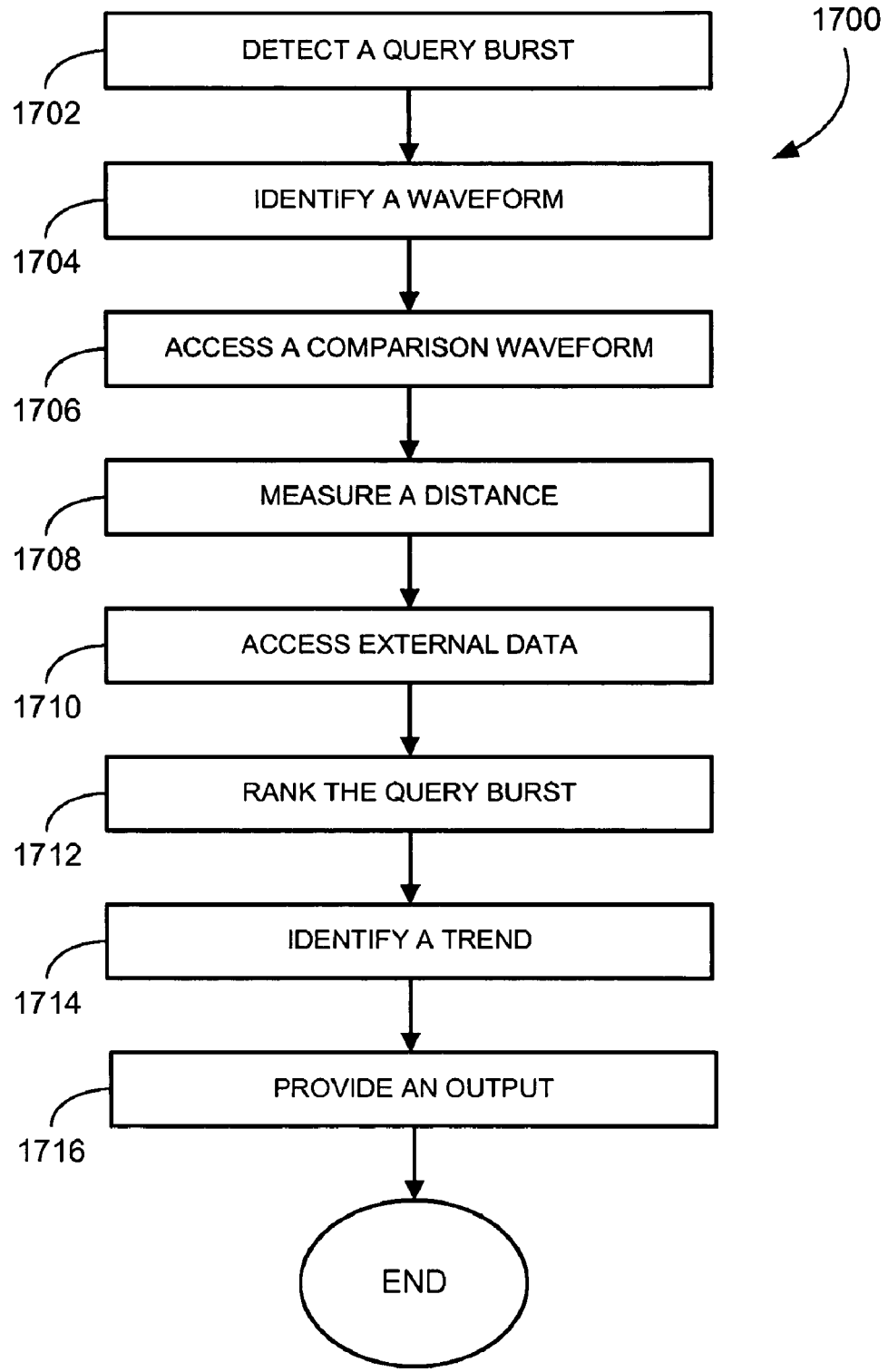
FIG. 17 is a flowchart illustrating a method for query ranking according to an example embodiment.

FIG. 17 illustrates a method 1700 for query ranking according to an example embodiment. The method 1700 may be performed by the provider 106 and/or the client machine 102 of the system 100 (see FIG. 1) or otherwise performed.

A query burst is detected among a number of queries to a data source at block 1702. A graphic query formation (e.g., a waveform) is identified among the queries based on the query burst at block 1704.

A comparison graphic query formation is accessed at block 1706. The comparison graphic query formation may be, in an example embodiment, based on an ideal surprise and include a huge rise and a huge fall. However, other comparison graphic query formations may also be used. A distance between the graphic query formation and the comparison graphic query formation may be measured at block 1708.

External data may be accessed at block 1710. The external data may include, by way of example, a news article, user activity, a newly listed item, or the like. The query burst is ranked based on the graphic query formation, the closeness of the graphic query formation to a comparison graphic query formation, the distance, and/or external data at block 1712. The ranking may be based on the graphic query formations based on spikiness, the graphic query formation representing the greatest surprise, or the like. The ranking may be based an appearance of the graphic query formation (e.g., how much did the graphic query formation spike and/or how often did the graphic query formation spike).

The ranking of the query burst may be based on an attribute of the graphic query formation. The attribute may include, by way of example, duration of the query burst, popularity of the query burst, an arrival rate of the queries associated with the query burst, a span ratio of the query burst, a momentum of the query burst, a concentration of the query burst, or the like. A trend may be identified based on graphic query formation at block 1714.

In an example embodiment, a time series information, samples, and/or an optimal state sequence may be used by the method 1700 for the query bursts. A time period when the automaton was in the high state may be utilized.

The method 1700 may, for a particular query burst, calculate one or more quantities that are later used for ranking and sorting.

Duration of surprise (D): This may be defined as the number of seconds for which the query burst lasted.

Mass (Popularity) of surprise (M): The popularity of a query burst may be defined in the unit of number of queries. It may indicate how many queries were received for the term during the time period associated with the query burst.

Arrival Rate for Surprise (A): This may be the rate of arrival of term queries during the time period associated with the query burst. A gap sequence (e.g., the number of seconds) between subsequent arrivals which we used for mining may be used for the query bursts. The average value of these gaps in time may indicate an average time to wait before a next term is used during the time period associated with the query burst. The inverse of this average value of gaps may provide us the arrival rate A. The rate may denote the frequency of arrivals during the surprise interest period and its unit may be $sec^{-1}$.

Span Ratio (SR): For a surprise with duration D, a non query burst period duration before the query burst period (D1) and after the query burst period (D2) may be determined. Span Ratio may be then defined as (D1+D2)/D. Thus SR may indicate the relative shortness of D.

Momentum of Surprise (Mo): This may be defined as the product of arrival rate for surprise and popularity of surprise. Thus Mo=(M*A).

Concentration of Surprise (Xc): This may be defined as a function of SR and as Xc=SR*Mo or Xc=$((SR)^{(0.1)})$*Mo. Concentration of query bursts Xc may be the final calculated score that may be used for ranking and sorting query bursts.

In an example embodiment, a query burst may be ranked higher if it's spikier, e.g., if its duration is lower as compared to the surrounding non query burst durations. Also a query burst may be is ranked higher if it has more popularity or a higher arrival rate. As a result query bursts in popular queries may be ranked higher because the mass is higher. Higher ranking with higher arrival rate again may lead to spikier surprises for popular queries being ranked higher than not too spiky query bursts for popular queries.

An output may be provided at block 1716. The output may include a ranking of the query burst and/or identification of the trend.

Figure 18:
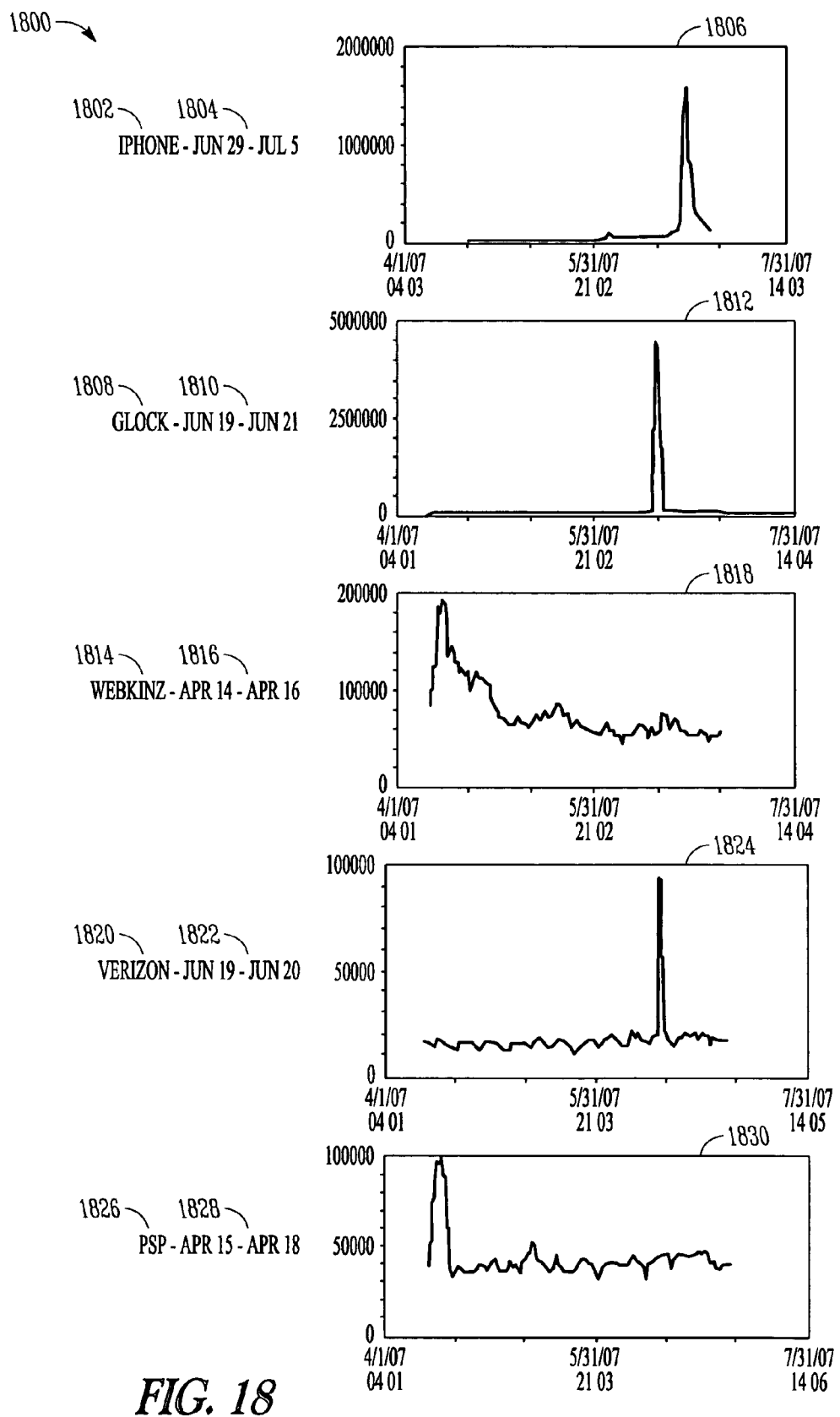
FIG. 18 is an example table according to an example embodiment.

FIG. 18 illustrates a table 1800 in which query bursts are sorted according to concentration based ranking in accordance with an example embodiment. By way of example, the X axis of the table 1800 for the Temporal Frequency Patterns denotes day of the year, and Y axis of the table 1800 shows query frequencies on an arbitrary relative scale.

Figure 19:
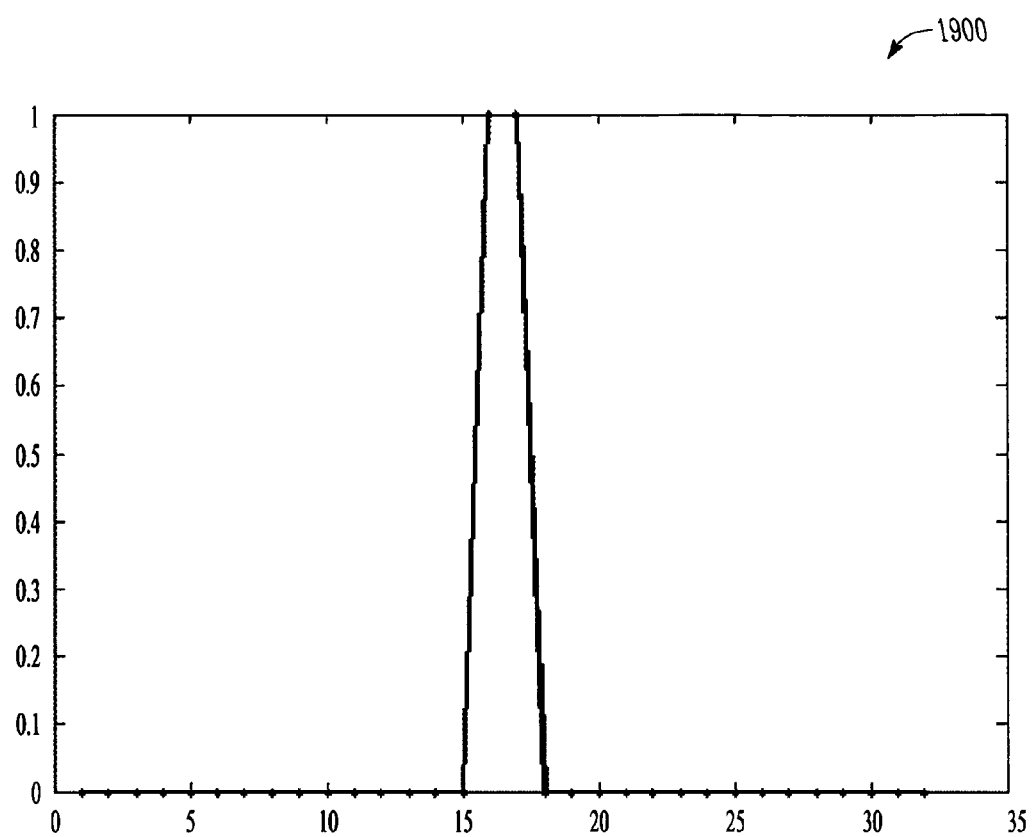
FIG. 19 is an example graph according to an example embodiment.

FIG. 19 illustrates a graph 1900 of a comparison graphic query formation of a query burst in accordance with an example embodiment. The comparison graphic query formation may be, in an example embodiment, a function close to an impulse function (e.g., something that gained transient popularity without any cause and then vanished).

Figure 20:
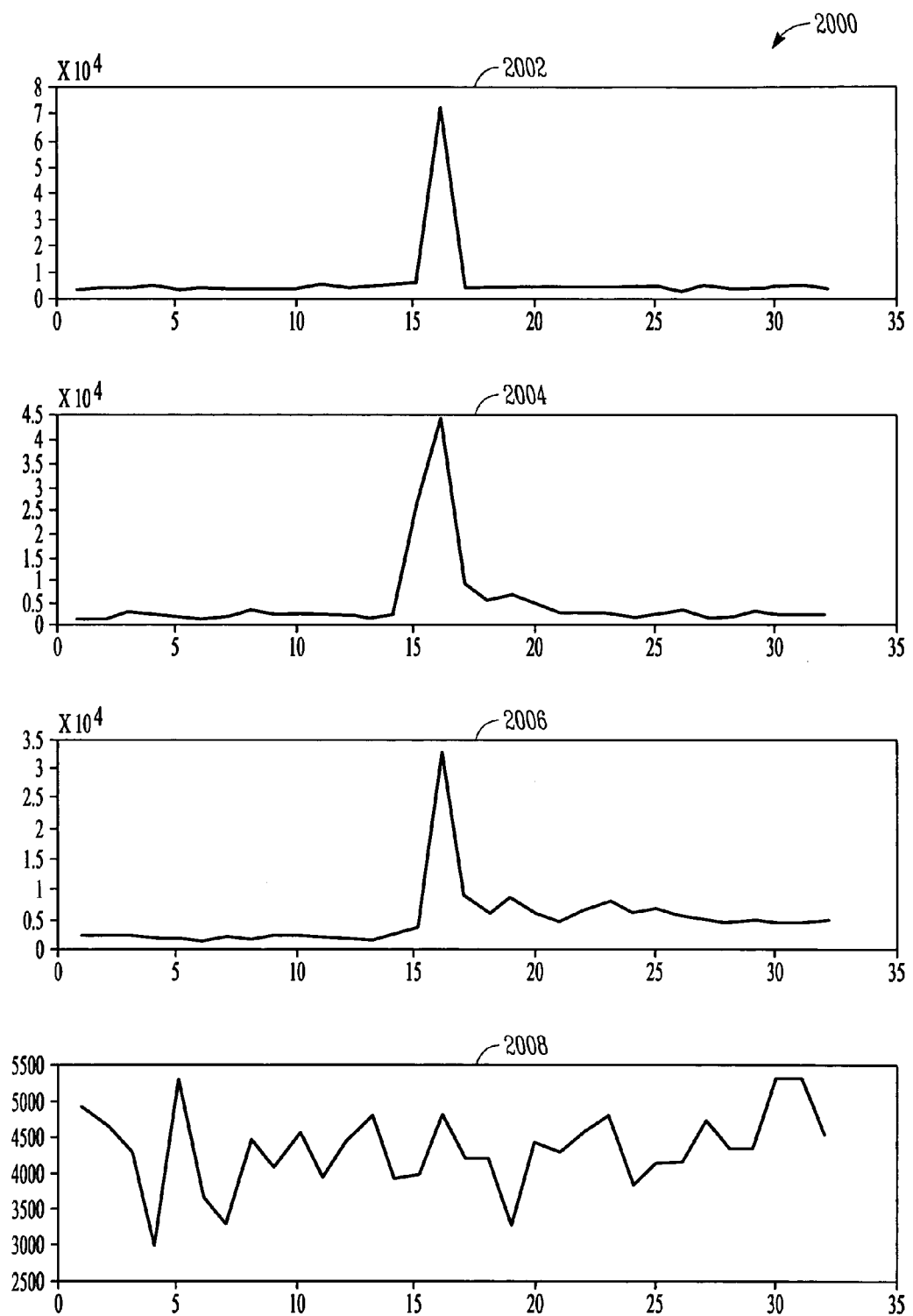
FIG. 20 is an example table according to an example embodiment.

FIG. 20 illustrates a table 2000 of graphs in accordance with an example embodiment. The distance of query burst may be measured from the comparison graphic query formation in the wavelet transform domain and rank them based on increasing distances. The lesser the distance of a query burst from the comparison graphic query formation, the greater the intensity of the query burst.

The graph 2002 may be for the term "wallet" with a rank of one and an intensity of the query burst at 1.011. The graph 2004 may be for the term "hobo" with a rank of three and an intensity of the query burst at 0.933.

The graph 2006 may be for the term "Paris hilton" with a rank of five and an intensity of the query burst at 0.929. The graph 2008 may be for the term "treo 755p" with a rank of three hundred and forth one and an intensity of the query burst at 0.049.

Figure 21:
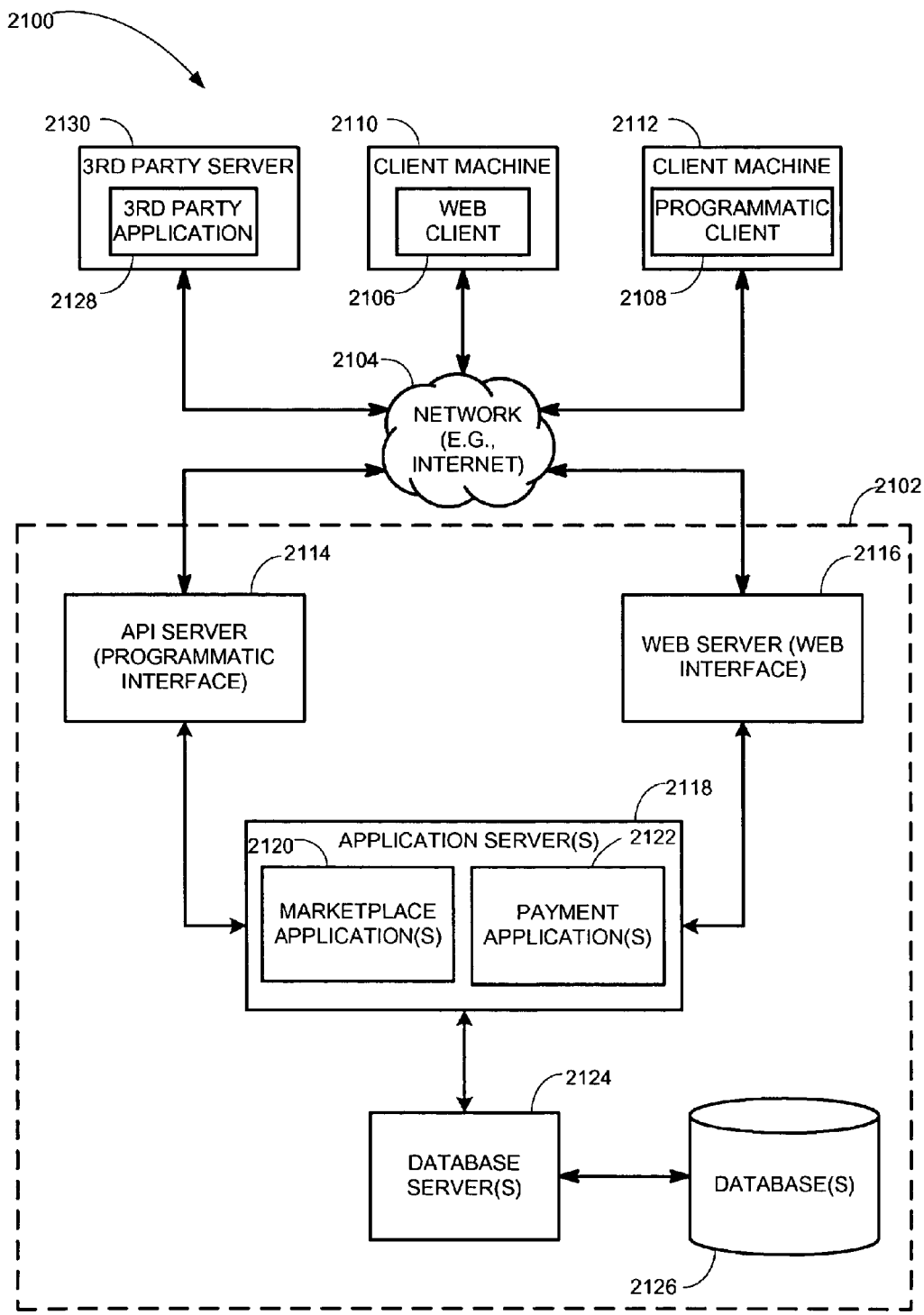
FIG. 21 is a network diagram depicting a network system, according to one embodiment, having a client server architecture configured for exchanging data over a network.

FIG. 21 is a network diagram depicting a client-server system 2100, within which one example embodiment may be deployed. By way of example, a network 2104 may include the functionality of the network 104, the provider 106 may be deployed within an application server 2118, and the client machine 102 may include the functionality of a client machine 2110 or a client machine 2112. The system 2100 may also be deployed in other systems.

A networked system 2102, in the example forms of a network-based marketplace or publication system, provides server-side functionality, via a network 2104 (e.g., the Internet or Wide Area Network (WAN)) to one or more clients. FIG. 21 illustrates, for example, a web client 2106 (e.g., a browser, such as the Internet Explorer browser developed by Microsoft Corporation of Redmond, Wash. State), and a programmatic client 2108 executing on respective client machines 2110 and 2112.

An Application Program Interface (API) server 2114 and a web server 2116 are coupled to, and provide programmatic and web interfaces respectively to, one or more application servers 2118. The application servers 2118 host one or more marketplace applications 2120 and authentication providers 2122. The application servers 2118 are, in turn, shown to be coupled to one or more databases servers 2124 that facilitate access to one or more databases 2126.

The marketplace applications 2120 may provide a number of marketplace functions and services to users that access the networked system 2102. The authentication providers 2122 may likewise provide a number of payment services and functions to users. The authentication providers 2122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 2120. While the marketplace and authentication providers 2120 and 2122 are shown in FIG. 21 to both form part of the networked system 2102, in alternative embodiments the authentication providers 2122 may form part of a payment service that is separate and distinct from the networked system 2102.

Further, while the system 2100 shown in FIG. 21 employs a client-server architecture, embodiments of the present invention are of course not limited to such an architecture, and could equally well find application in a distributed, or peer-to-peer, architecture system, for example. The various marketplace and authentication providers 2120 and 2122 could also be implemented as standalone software programs, which need not have networking capabilities.

The web client 2106 accesses the various marketplace and authentication providers 2120 and 2122 via the web interface supported by the web server 2116. Similarly, the programmatic client 2108 accesses the various services and functions provided by the marketplace and authentication providers 2120 and 2122 via the programmatic interface provided by the API server 2114. The programmatic client 2108 may, for example, be a seller application (e.g., the TurboLister™ application developed by eBay Inc., of San Jose, Calif.) to enable sellers to author and manage listings on the networked system 2102 in an off-line manner, and to perform batch-mode communications between the programmatic client 2108 and the networked system 2102.

FIG. 21 also illustrates a third party application 2128, executing on a third party server machine 2130, as having programmatic access to the networked system 2102 via the programmatic interface provided by the API server 2114. For example, the third party application 2128 may, utilizing information retrieved from the networked system 2102, support one or more features or functions on a website hosted by the third party. The third party may, for example, provide one or more promotional, marketplace or payment functions that are supported by the relevant applications of the networked system 2102.

Figure 22:
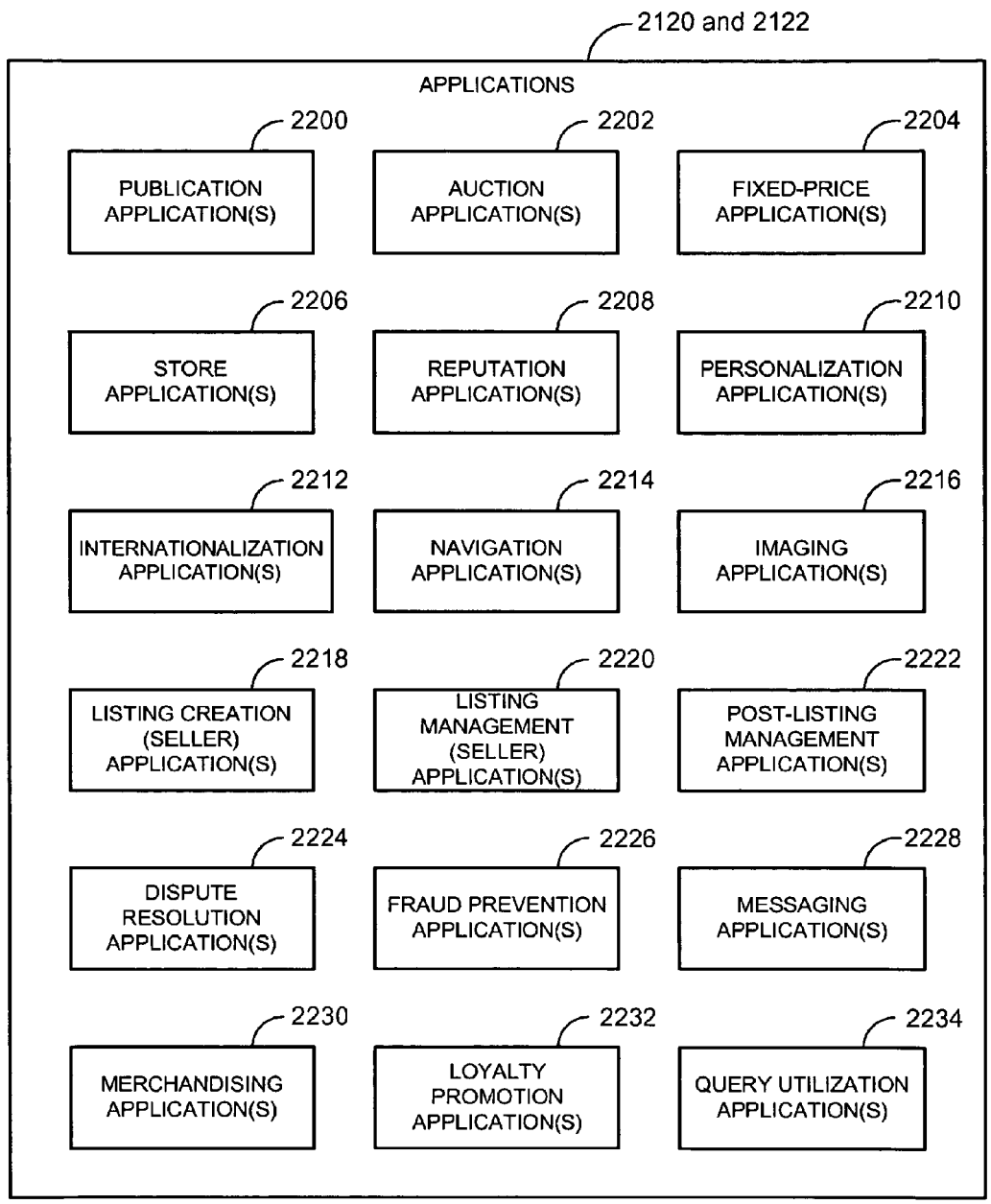
FIG. 22 is a block diagram illustrating an example embodiment of multiple network and marketplace applications, which are provided as part of the network-based marketplace.

FIG. 22 is a block diagram illustrating multiple applications 2120 and 2122 that, in one example embodiment, are provided as part of the networked system 2102 (see FIG. 21). The applications 2120 may be hosted on dedicated or shared server machines (not shown) that are communicatively coupled to enable communications between server machines. The applications themselves are communicatively coupled (e.g., via appropriate interfaces) to each other and to various data sources, so as to allow information to be passed between the applications or so as to allow the applications to share and access common data. The applications may furthermore access one or more databases 2126 via the database servers 2124.

The networked system 2102 may provide a number of publishing, listing and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace applications 2120 are shown to include at least one publication application 2200 and one or more auction applications 2202 which support auction-format listing and price setting mechanisms (e.g., English, Dutch, Vickrey, Chinese, Double, Reverse auctions etc.). The various auction applications 2202 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 2204 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 2206 allow a seller to group listings within a "virtual" store, which may be branded and otherwise personalized by and for the seller. Such a virtual store may also offer promotions, incentives and features that are specific and personalized to a relevant seller.

Reputation applications 2208 allow users that transact, utilizing the networked system 2102, to establish, build and maintain reputations, which may be made available and published to potential trading partners. Consider that where, for example, the networked system 2102 supports person-to-person trading, users may otherwise have no history or other reference information whereby the trustworthiness and credibility of potential trading partners may be assessed. The reputation applications 2208 allow a user, for example through feedback provided by other transaction partners, to establish a reputation within the networked system 2102 over time. Other potential trading partners may then reference such a reputation for the purposes of assessing credibility and trustworthiness.

Personalization applications 2210 allow users of the networked system 2102 to personalize various aspects of their interactions with the networked system 2102. For example a user may, utilizing an appropriate personalization application 2210, create a personalized reference page at which information regarding transactions to which the user is (or has been)

a party may be viewed. Further, a personalization application 2210 may enable a user to personalize listings and other aspects of their interactions with the networked system 2102 and other parties.

The networked system 2102 may support a number of marketplaces that are customized, for example, for specific geographic regions. A version of the networked system 2102 may be customized for the United Kingdom, whereas another version of the networked system 2102 may be customized for the United States. Each of these versions may operate as an independent marketplace, or may be customized (or internationalized and/or localized) presentations of a common underlying marketplace. The networked system 2102 may accordingly include a number of internationalization applications 2212 that customize information (and/or the presentation of information) by the networked system 2102 according to predetermined criteria (e.g., geographic, demographic or marketplace criteria). For example, the internationalization applications 2212 may be used to support the customization of information for a number of regional websites that are operated by the networked system 2102 and that are accessible via respective web servers 2116.

Navigation of the networked system 2102 may be facilitated by one or more navigation applications 2214. For example, a search application (as an example of a navigation application) may enable key word searches of listings published via the networked system 2102. A browse application may allow users to browse various category, catalogue, or system inventory structures according to which listings may be classified within the networked system 2102. Various other navigation applications may be provided to supplement the search and browsing applications.

In order to make listings available via the networked system 2102 as visually informing and attractive as possible, the marketplace applications 2120 may include one or more imaging applications 2216 utilizing which users may upload images for inclusion within listings. An imaging application 2216 also operates to incorporate images within viewed listings. The imaging applications 2216 may also support one or more promotional features, such as image galleries that are presented to potential buyers. For example, sellers may pay an additional fee to have an image included within a gallery of images for promoted items.

Listing creation applications 2218 allow sellers conveniently to author listings pertaining to goods or services that they wish to transact via the networked system 2102, and listing management applications 2200 allow sellers to manage such listings. Specifically, where a particular seller has authored and/or published a large number of listings, the management of such listings may present a challenge. The listing management applications 2200 provide a number of features (e.g., auto-relisting, inventory level monitors, etc.) to assist the seller in managing such listings. One or more post-listing management applications 2202 also assist sellers with a number of activities that typically occur post-listing. For example, upon completion of an auction facilitated by one or more auction applications 2102, a seller may wish to leave feedback regarding a particular buyer. To this end, a post-listing management application 2202 may provide an interface to one or more reputation applications 2208, so as to allow the seller conveniently to provide feedback regarding multiple buyers to the reputation applications 2208.

Dispute resolution applications 2214 provide mechanisms whereby disputes arising between transacting parties may be resolved. For example, the dispute resolution applications 2214 may provide guided procedures whereby the parties are guided through a number of steps in an attempt to settle a dispute. In the event that the dispute cannot be settled via the guided procedures, the dispute may be escalated to a merchant mediator or arbitrator.

A number of fraud prevention applications 2226 implement fraud detection and prevention mechanisms to reduce the occurrence of fraud within the networked system 2102.

Messaging applications 2228 are responsible for the generation and delivery of messages to users of the networked system 2102, such messages for example advising users regarding the status of listings at the networked system 2102 (e.g., providing "outbid" notices to bidders during an auction process or to provide promotional and merchandising information to users). Respective messaging applications 2228 may utilize any one have a number of message delivery networks and platforms to deliver messages to users. For example, messaging applications 2228 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

Merchandising applications 2230 support various merchandising functions that are made available to sellers to enable sellers to increase sales via the networked system 2102. The merchandising applications 2230 also operate the various merchandising features that may be invoked by sellers, and may monitor and track the success of merchandising strategies employed by sellers.

The networked system 2102 itself, or one or more parties that transact via the networked system 2102, may operate loyalty programs that are supported by one or more loyalty/promotions applications 2232. For example, a buyer may earn loyalty or promotions points for each transaction established and/or concluded with a particular seller, and may be offered a reward for which accumulated loyalty points can be redeemed.

Query utilization applications 2234 may detect, classify, and/or rank query bursts. The query bursts may be detected based on information received from the applications 2200, 2202, 2204, 2206, 2214, 2216, 2218, 2220, 2222, 2230; however the query bursts may be detected based on information received from other applications.

Figure 23:
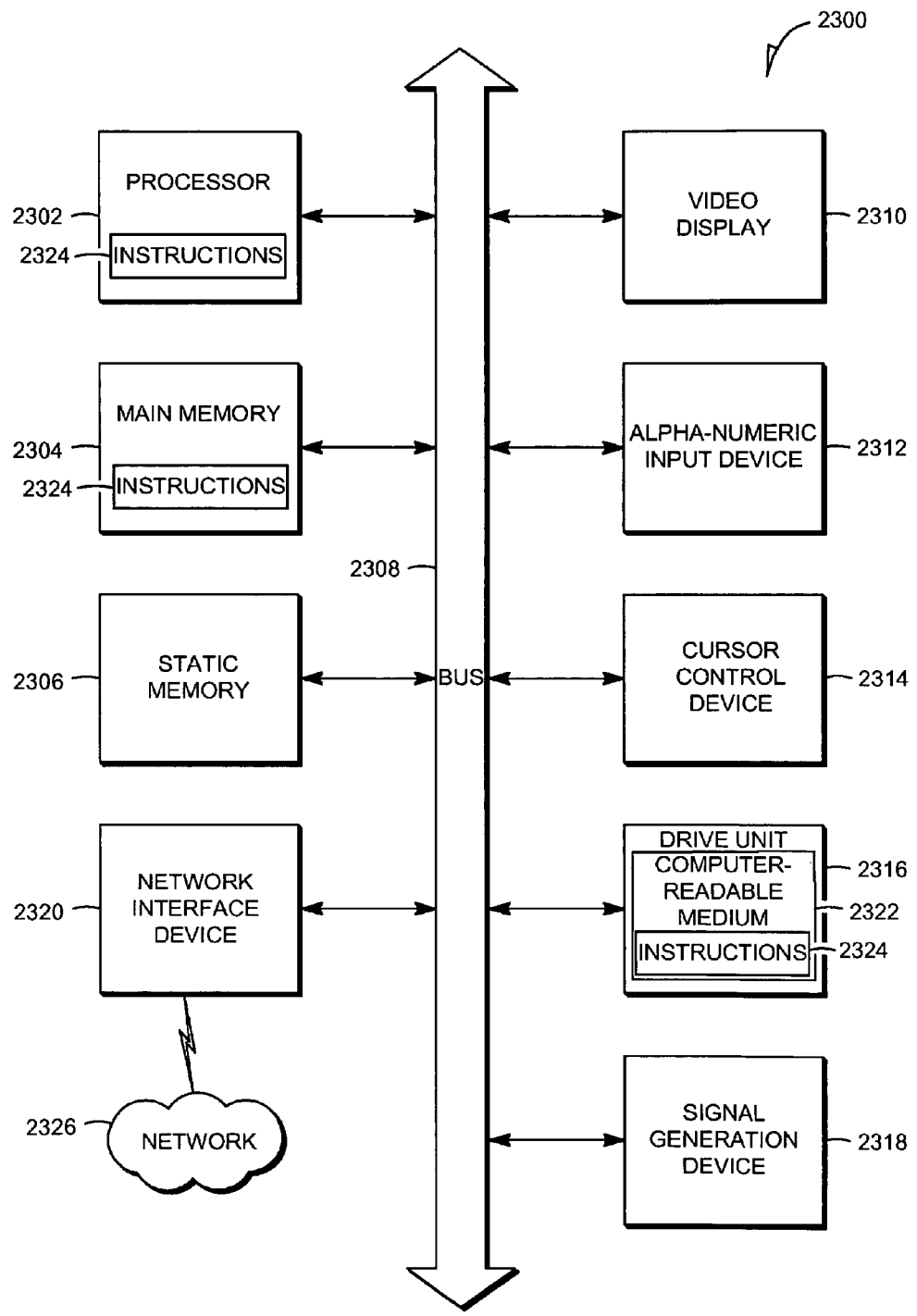
FIG. 23 is a block diagram diagrammatic representation of machine in the example form of a computer system within which a set of instructions for causing the machine to perform any one or more of the methodologies discussed herein may be executed.

FIG. 23 shows a diagrammatic representation of machine in the example form of a computer system 2300 within which a set of instructions may be executed causing the machine to perform any one or more of the methods, processes, operations, or methodologies discussed herein. The provider 106 may operate on one or more computer systems 2300. The client machine 102 may include the functionality of the one or more computer systems 2300.

In an example embodiment, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 2300 includes a processor 2302 (e.g., a central processing unit (CPU) a graphics processing unit (GPU) or both), a main memory 2304 and a static memory 2306, which communicate with each other via a bus 2308. The computer system 2300 may further include a video display unit 2310 (e.g., a liquid crystal display (LCD) or a cathode ray tube (CRT)). The computer system 2300 also includes an alphanumeric input device 2312 (e.g., a keyboard), a cursor control device 2314 (e.g., a mouse), a drive unit 2316, a signal generation device 2318 (e.g., a speaker) and a network interface device 2320.

The drive unit 2316 includes a machine-readable medium 2322 on which is stored one or more sets of instructions (e.g., software 2324) embodying any one or more of the methodologies or functions described herein. The software 2324 may also reside, completely or at least partially, within the main memory 2304 and/or within the processor 2302 during execution thereof by the computer system 2300, the main memory 2304 and the processor 2302 also constituting machine-readable media.

The software 2324 may further be transmitted or received over a network 2326 via the network interface device 2320.

While the machine-readable medium 2322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Certain systems, apparatus, applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information). The modules be implemented as hardware circuitry, optical components, single or multi-processor circuits, memory circuits, software program modules and objects, firmware, and combinations thereof, as appropriate for particular implementations of various embodiments.

In an example embodiment, a rate of a plurality of queries to a data source may be determined for each of a plurality of time periods. The plurality of queries may be associated with a term. A cost may be associated with a normal-to-deviated query state transition and a deviated-to-normal query state transition. A normal query state or a deviated query state may be assigned to a particular query on a particular time period of the plurality of time periods based on the rate of queries for the particular time period and the cost of the normal-to-deviated query state transition and the deviated-to-normal query state transition. A query burst may be identified during the plurality of time periods based on assignment of the normal query state or the deviated query state to the plurality of queries. The query burst may have the normal query state, the normal-to-deviated query state transition, and the deviated query state during a time period.

In an example embodiment, a rate of a plurality of queries to a data source may be determined for a plurality of time periods. The plurality of queries may be associated with a term. Cost minimization analysis may be performed on the plurality of queries for the plurality of time periods. A result of the performing cost minimization analysis may be stored. A plurality of additional queries to the data source may be monitored. The plurality of additional queries may be associated with the term. The cost minimization analysis may be performed on the plurality of additional queries for an additional time period. A normal query state or a deviated query state may be assigned to a particular query for the additional time period based on the cost minimization analysis performed on the plurality of queries and the plurality of additional queries. A query burst may be identified during the plurality of time periods and the additional time period based on assignment of the normal query state or the deviated query state for the particular query. The query burst may have the normal query state, the normal-to-deviated query state transition, and the deviated query state during a time period.

In an example embodiment, a query burst may be detected among a plurality of queries to a data source. The query burst may be converted using a wavelet transform. A clustering technique may be applied to a result of the converting. The query burst may be classified based on the applying of the clustering technique.

In an example embodiment, a query burst may be detected among a plurality of queries to a data source. A graphic query formation may be identified among the plurality of queries based on the query burst. The query burst may be ranked based on the graphic query formation.

Thus, methods and systems for query utilization have been described. Although embodiments of the present invention have been described with reference to specific example embodiments, it will be evident that various modifications and changes may be made to these embodiments without departing from the broader spirit and scope of the embodiments of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
    using one or more computer processors, determining, for each of a plurality of time periods, a rate of a plurality of queries to a data source, the plurality of queries associated with a term;
    associating a cost with a normal-to-deviated query state transition and a deviated-to-normal query state transition;
    assigning a normal query state or a deviated query state to a particular query for a particular time period of the plurality of time periods, the assigning being based on a particular query rate of the rate of the plurality of queries for the particular time period and the cost of the normal-to-deviated query state transition and the deviated-to-normal query state transition; and identifying a query burst during the plurality of time periods based on assignment of the normal query state or the deviated query state to each of the plurality of queries, the query burst having the normal query state, the normal-to-deviated query state transition, and the deviated query state during a plurality of associated time periods.

2. The method of claim 1, further comprising:
providing an output including identification of the query burst.

3. The method of claim 1, further comprising:
providing an output based a determination of the rate of the plurality of queries and on assignment of the normal query state or the deviated query state.

4. The method of claim 1, further comprising:
performing cost minimization analysis on the plurality of queries,
wherein the assigning being based on the particular query rate, the cost of the normal-to-deviated query state transition and the deviated-to-normal query state transition, and a result of the cost minimization analysis.

5. The method of claim 1, further comprising:
logging the plurality of queries to the data source,
wherein the determining of the rate is based on the logging of the plurality of queries.

6. The method of claim 1, further comprising:
converting frequency information for the particular query into a time series, the time series indicating timestamps of the arrivals of respective queries of the plurality of queries associated with the term,
wherein the assigning being based on the particular query rate, the cost of the normal-to-deviated query state transition and the deviated-to-normal query state transition, and a result of the converting of the frequency information.

7. The method of claim 1, wherein the plurality of time periods include a plurality of days.

8. A method comprising:
determining, for each of a plurality of time periods, a rate of a plurality of queries to a data source, the plurality of queries associated with a term;
performing cost minimization analysis on each of the plurality of queries for the plurality of time periods;
storing a result of the performing of the cost minimization analysis;
monitoring a plurality of additional queries to the data source, the plurality of additional queries associated with the term;
performing the cost minimization analysis on each of the plurality of additional queries for an additional time period;
assigning a normal query state or a deviated query state to a particular query for the additional time period based on the cost minimization analysis performed on the plurality of queries and the plurality of additional queries; and
identifying a query burst during the plurality of time periods and the additional time period based on assignment of the normal query state or the deviated query state to the particular query, the query burst having the normal query state, the normal-to-deviated query state transition, and the deviated query state during a plurality of associated time periods.

9. The method of claim 8, further comprising:
providing an output including identification of the query burst.

10. The method of claim 8, further comprising:
determining a rate of change of percentage volume for the plurality of additional queries to the data source; and
comparing the rate of change of percentage volume for the plurality of additional queries associated to a rate of change of absolute volume for the plurality of additional queries associated,
wherein the assigning of the normal query state or the deviated query state to the particular query is based on the cost minimization analysis performed on the plurality of queries and the plurality of additional queries and the comparing.

11. The method of claim 8, further comprising:
associating a cost with a normal-to-deviated query state transition and a deviated-to-normal query state transition,
wherein the assigning of the normal query state or the deviated query state for the particular query is based on the cost minimization analysis performed on the plurality of queries and the plurality of additional queries and the cost of the normal-to-deviated query state transition and the deviated-to-normal query state transition.

12. The method of claim 8, further comprising:
converting frequency information for the particular query into a time series, the time series indicating timestamps of the arrival of the plurality of additional queries associated with the term,
wherein the assigning of the normal query state or the deviated query state for the particular query is based on the cost minimization analysis performed on the plurality of queries and the plurality of additional queries and the converting of the frequency information.

13. A non-transitory machine-readable medium comprising instructions, which when implemented by one or more processors perform the following operations:
determine, for each of a plurality of time periods, a rate of a plurality of queries to a data source, the plurality of queries associated with a term;
associate a cost with a normal-to-deviated query state transition and a deviated-to-normal query state transition;
assign a normal query state or a deviated query state to a particular query for a particular time period of the plurality of time periods, assignment being based on a particular query rate of the rate of the plurality of queries for the particular time period and the cost of the normal-to-deviated query state transition and the deviated-to-normal query state transition; and
identify a query burst during the plurality of time periods based on the assignment of the normal query state or the deviated query state to each of the plurality of queries, the query burst having the normal query state, the normal-to-deviated query state transition, and the deviated query state during a plurality of associated time periods.

14. The machine-readable medium of claim 13 further comprising instructions, which when implemented by one or more processors perform the following operations:
perform cost minimization analysis on the plurality of queries,
wherein the assignment is based on the particular query rate, the cost of the normal-to-deviated query state transition and the deviated-to-normal query state transition, and a result of the cost minimization analysis.

15. A system comprising:
add one or more computer processors and memory adapted to store and execute a query rate determination module to determine, for each of a plurality of time periods, a rate of a plurality of queries to a data source, the plurality of queries associated with a term;

a cost association module to associate a cost with a normal-to-deviated query state transition and a deviated-to-normal query state transition;

a state assignment module to assign a normal query state or a deviated query state to a particular query for a particular time period of the plurality of time periods, assignment being based on a particular query rate of the rate of the plurality of queries for the particular time period determined by the query rate determination module and the cost of the normal-to-deviated query state transition and the deviated-to-normal query state transition associated by the cost association module; and a query burst identification module to identify a query burst during the plurality of time periods based on the assignment of the normal query state or the deviated query state to each of the plurality of queries by the state assignment module, the query burst having the normal query state, the normal-to-deviated query state transition, and the deviated query state during a plurality of associated time periods.

16. The system of claim 15, further comprising:

a burst conversion module to convert the query burst identified by the query burst identification module to a wavelet using a wavelet transform;

a clustering module to apply a clustering technique to the wavelet created by the burst conversion module; and a query classification module to classify the query burst based on the applying of the clustering technique by the clustering module.

17. The system of claim 16, further comprising:

a formation identification module to identify a graphic query formation among the plurality of queries based on the query burst; and a ranking module to rank the query burst based on the graphic query formation identified by the format identification module.

* * * * *

UNITED STATES PATENT AND TRADEMARK OFFICE
CERTIFICATE OF CORRECTION

PATENT NO. : 7,958,141 B2
APPLICATION NO. : 12/190517
DATED : June 7, 2011
INVENTOR(S) : Sundaresan et al.

It is certified that error appears in the above-identified patent and that said Letters Patent is hereby corrected as shown below:

In column 6, lines 57-58, delete "$q_{i_t} \neq q_{i_{t+1}}$" and insert -- $q_{i_t} \neq q_{i_{t+1}}$ --, therefor.

In column 12, line 61, delete ""Paris" and insert -- "paris --, therefor.

In column 20, line 65, in Claim 15, before "one" delete "add".

Signed and Sealed this
Tenth Day of January, 2012

David J. Kappos
*Director of the United States Patent and Trademark Office*